United States Patent
Meda et al.

(10) Patent No.: US 12,291,078 B2
(45) Date of Patent: May 6, 2025

(54) AIR CONDITIONING UNIT

(71) Applicant: Dometic Sweden AB, Solna (SE)

(72) Inventors: Samuele Meda, Chichester (GB); Anton Lundqvist, Älvsjö (SE)

(73) Assignee: Dometic Sweden AB, Solna (SE)

( * ) Notice: Subject to any disclaimer, the term of this patent is extended or adjusted under 35 U.S.C. 154(b) by 134 days.

(21) Appl. No.: 17/998,616

(22) PCT Filed: May 3, 2021

(86) PCT No.: PCT/EP2021/061578
§ 371 (c)(1),
(2) Date: Nov. 11, 2022

(87) PCT Pub. No.: WO2021/228605
PCT Pub. Date: Nov. 18, 2021

(65) Prior Publication Data
US 2023/0339285 A1 Oct. 26, 2023

(30) Foreign Application Priority Data
May 15, 2020 (DE) .......................... 102020206183.1

(51) Int. Cl.
*B60H 1/00* (2006.01)
(52) U.S. Cl.
CPC ..... *B60H 1/00364* (2013.01); *B60H 1/00521* (2013.01); *B60H 2001/00235* (2013.01)
(58) Field of Classification Search
CPC ............ B60H 1/00364; B60H 1/00521; B60H 2001/00235
See application file for complete search history.

(56) References Cited

U.S. PATENT DOCUMENTS 2,799,143 A * 7/1957 Weigel ................... F25B 41/20
62/278
D226,381 S 2/1973 Harty, Jr.
(Continued)

FOREIGN PATENT DOCUMENTS

AU 2004202967 B2 12/2010
AU 2007200788 B2 6/2011
(Continued)

OTHER PUBLICATIONS

German Patent Application No. 112021000525.1 titled "Heating, Ventilation and Air Conditioning System with Illumination" filed on Sep. 12, 2022.
(Continued)

*Primary Examiner* — Emmanuel E Duke
(74) *Attorney, Agent, or Firm* — Dinsmore & Shohl LLP

(57) ABSTRACT

The present invention relates to an air conditioning unit configured to be mounted on a vehicle, comprising a housing that is openable in a state when the air conditioning unit is mounted on the vehicle, the air conditioning unit further comprising a first air circuit within the housing, a second air circuit within the housing, an evaporator being arranged in the first air circuit and a condenser being arranged in the second air circuit, the air conditioning unit is configured such that at least two different fan arrangements, including a first fan arrangement and a second fan arrangement, can be installed in the air conditioning unit in a mutually exchangeable manner, wherein each of the at least two different fan arrangements comprising a first fan and a second fan, and, when installed in the air conditioning unit 1, the first fan is arranged in the first air circuit and is configured to generate an air flow in the first air circuit in order to enhance an exchange of thermal energy between the air flowing in the first air circuit and the evaporator, and the second fan is arranged in the second air circuit and is configured to (Continued)

generate an air flow in the second air circuit in order to enhance an exchange of thermal energy between the air flowing in the second air circuit and the condenser. The present invention further relates to a construction kit for the air conditioning unit, the construction kit including one of the fan arrangements.

18 Claims, 20 Drawing Sheets

(56) References Cited

U.S. PATENT DOCUMENTS

| | | | |
|---|---|---|---|
| 4,051,691 A | 10/1977 | Dawkins | |
| 4,366,530 A | 12/1982 | Milhous | |
| 4,513,809 A | 4/1985 | Schneider et al. | |
| D284,025 S | 5/1986 | Armstrong | |
| 4,641,502 A * | 2/1987 | Aldrich | B60H 1/00378 62/429 |
| 4,672,818 A | 6/1987 | Roth | |
| 4,709,623 A | 12/1987 | Roth et al. | |
| D300,777 S | 4/1989 | Bales et al. | |
| 4,825,936 A | 5/1989 | Hoagland et al. | |
| D306,341 S | 2/1990 | Bales et al. | |
| 5,184,474 A * | 2/1993 | Ferdows | B60H 1/00371 62/428 |
| 5,205,130 A | 4/1993 | Pannell | |
| 5,423,187 A | 6/1995 | Fournier | |
| 5,531,641 A | 7/1996 | Aldrich | |
| 5,848,536 A | 12/1998 | Dodge et al. | |
| 6,161,609 A * | 12/2000 | Ahn | B60H 1/00378 165/41 |
| 6,213,197 B1 | 4/2001 | Ebbeson | |
| 6,263,689 B1 | 7/2001 | Dodge et al. | |
| 6,339,934 B1 | 1/2002 | Yoon | |
| 6,357,249 B1 | 3/2002 | Robinson et al. | |
| 6,449,973 B2 | 9/2002 | Dodge et al. | |
| D469,173 S | 1/2003 | Kawanori et al. | |
| 6,595,499 B2 | 7/2003 | Colussi et al. | |
| D495,041 S | 8/2004 | Thomas | |
| 6,857,953 B2 | 2/2005 | Malott | |
| 7,140,192 B2 | 11/2006 | Allen et al. | |
| 7,171,822 B2 | 2/2007 | Allen et al. | |
| D538,413 S | 3/2007 | Lyu et al. | |
| 7,234,315 B2 | 6/2007 | Allen et al. | |
| 7,237,397 B2 | 7/2007 | Allen | |
| 7,316,119 B2 | 1/2008 | Allen | |
| D565,712 S | 4/2008 | Nagahori et al. | |
| 7,404,297 B2 | 7/2008 | Chen | |
| 7,419,368 B2 | 9/2008 | Milks | |
| D588,479 S | 3/2009 | Giese | |
| D591,410 S | 4/2009 | Kashimoto | |
| 7,739,882 B2 | 6/2010 | Evans et al. | |
| D621,492 S | 8/2010 | Tanaka et al. | |
| D627,043 S | 11/2010 | Tanaka et al. | |
| 7,963,117 B2 | 6/2011 | Allen et al. | |
| 8,056,351 B2 | 11/2011 | Marciano et al. | |
| D661,386 S | 6/2012 | Bergin | |
| D662,472 S | 6/2012 | Tien | |
| 8,240,168 B2 | 8/2012 | Holguin | |
| 8,347,950 B2 | 1/2013 | Stroobants | |
| D680,635 S | 4/2013 | Kashimoto et al. | |
| 8,416,101 B2 | 4/2013 | Lee et al. | |
| 8,440,143 B2 | 5/2013 | Liptak | |
| 8,535,127 B2 | 9/2013 | Malott | |
| 8,568,209 B2 | 10/2013 | Boxum | |
| D705,917 S | 5/2014 | Hagiwara | |
| D708,850 S | 7/2014 | Morine et al. | |
| D712,531 S | 9/2014 | Bergin | |
| D715,907 S | 10/2014 | Bergin | |
| D716,925 S | 11/2014 | Bergin | |
| D724,715 S | 3/2015 | Isshiki | |
| D755,944 S | 5/2016 | Daniels | |
| D759,223 S | 6/2016 | Kosuge | |
| D762,528 S | 8/2016 | Allard et al. | |
| 9,476,608 B2 | 10/2016 | Yang et al. | |
| D770,787 S | 11/2016 | Kim et al. | |
| D773,023 S | 11/2016 | Nishiguchi et al. | |
| D773,024 S | 11/2016 | Nishiguchi et al. | |
| D773,025 S | 11/2016 | Nishiguchi et al. | |
| D773,625 S | 12/2016 | Nishiguchi et al. | |
| 9,618,260 B2 | 4/2017 | Kang | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin et al. | |
| D796,018 S | 8/2017 | Kusuki | |
| 9,757,674 B2 | 9/2017 | Kwon et al. | |
| D810,251 S | 2/2018 | Yamashita | |
| D811,566 S | 2/2018 | Liu et al. | |
| D817,466 S | 5/2018 | Moseley | |
| 9,975,405 B2 | 5/2018 | Siddiqui et al. | |
| D822,190 S | 7/2018 | Niki | |
| D822,806 S | 7/2018 | Niki | |
| D822,807 S | 7/2018 | Niki | |
| D822,808 S | 7/2018 | Niki | |
| D822,809 S | 7/2018 | Niki | |
| D822,810 S | 7/2018 | Niki | |
| D822,811 S | 7/2018 | Niki | |
| D824,499 S | 7/2018 | Williamson et al. | |
| D827,116 S | 8/2018 | Isshiki | |
| 10,082,345 B1 | 9/2018 | Mihail | |
| D830,526 S | 10/2018 | Niki | |
| D830,527 S | 10/2018 | Niki | |
| 10,093,152 B2 | 10/2018 | Allard et al. | |
| D832,987 S | 11/2018 | Bergin | |
| D838,629 S | 1/2019 | Hinsey et al. | |
| D839,139 S | 1/2019 | Hinsey et al. | |
| D841,138 S | 2/2019 | Williamson et al. | |
| D841,139 S | 2/2019 | Bergin | |
| D846,717 S | 4/2019 | Niki | |
| D846,718 S | 4/2019 | Niki | |
| D846,720 S | 4/2019 | Niki | |
| D849,217 S | 5/2019 | Yamashita | |
| D850,609 S | 6/2019 | Bergin | |
| D862,668 S | 10/2019 | Moseley | |
| D865,926 S | 11/2019 | Moseley | |
| D879,928 S | 3/2020 | Fujioka et al. | |
| 10,589,593 B2 | 3/2020 | Westendarp et al. | |
| D882,054 S | 4/2020 | Shiota | |
| D883,459 S | 5/2020 | Ishihama et al. | |
| D884,870 S | 5/2020 | Bergin | |
| 10,675,941 B2 | 6/2020 | Williamson et al. | |
| 10,696,129 B2 | 6/2020 | Bergin | |
| D905,217 S | 8/2020 | Hederstierna et al. | |
| D902,365 S | 11/2020 | Niki | |
| D907,183 S | 1/2021 | Meda et al. | |
| 10,941,955 B2 | 3/2021 | Heral | |
| D915,569 S | 4/2021 | Meda et al. | |
| D917,036 S | 4/2021 | Hederstierna et al. | |
| 11,027,595 B2 | 6/2021 | Smith et al. | |
| 11,034,208 B2 | 6/2021 | Williamson et al. | |
| D940,287 S | 1/2022 | Fidler | |
| D940,289 S | 1/2022 | Hederstierna et al. | |
| D944,374 S | 2/2022 | Hederstierna et al. | |
| 11,511,603 B2 | 11/2022 | Bilston et al. | |
| D980,410 S | 3/2023 | Kim et al. | |
| 11,752,827 B2 | 9/2023 | Meda et al. | |
| D1,010,080 S | 1/2024 | Hederstierna et al. | |
| 2004/0040325 A1 | 3/2004 | Evans | |
| 2004/0219924 A1 | 11/2004 | Flynn | |
| 2005/0163669 A1 | 7/2005 | Taylor et al. | |
| 2006/0016213 A1 | 1/2006 | Al Rashidi | |
| 2006/0018807 A1 | 1/2006 | Taylor et al. | |
| 2006/0052050 A1 | 3/2006 | Malott et al. | |
| 2007/0227693 A1 | 10/2007 | Allen et al. | |
| 2008/0202138 A1 | 8/2008 | Pabisz et al. | |
| 2009/0209193 A1 | 8/2009 | Kloster et al. | |
| 2011/0005248 A1 * | 1/2011 | Nazario | B60H 1/245 62/507 |
| 2011/0253847 A1 | 10/2011 | Kataoka | |
| 2012/0127050 A1 | 5/2012 | Song | |
| 2013/0120972 A1 | 5/2013 | Chung et al. | |

(56) References Cited

U.S. PATENT DOCUMENTS

| | | |
|---|---|---|
| 2013/0205811 A1 | 8/2013 | Esch |
| 2014/0223928 A1 | 8/2014 | Esch |
| 2014/0260393 A1 | 9/2014 | Siddiqui et al. |
| 2017/0079119 A1 | 3/2017 | Horist |
| 2017/0097162 A1 | 4/2017 | Shin et al. |
| 2017/0307242 A1 | 10/2017 | Handsaker et al. |
| 2018/0147913 A1 | 5/2018 | Bergin |
| 2018/0328618 A1 | 11/2018 | Palmer |
| 2019/0047353 A1 | 2/2019 | Williamson et al. |
| 2019/0047354 A1 | 2/2019 | Williamson et al. |
| 2019/0128551 A1 | 5/2019 | Heral |
| 2019/0315197 A1 | 10/2019 | Williamson et al. |
| 2020/0148028 A1 | 5/2020 | Westendarp et al. |
| 2020/0198438 A1 | 6/2020 | Liu et al. |
| 2020/0298655 A1 | 9/2020 | Williamson et al. |
| 2020/0338951 A1 | 10/2020 | Paci et al. |
| 2021/0061054 A1 | 3/2021 | Meda et al. |
| 2021/0061058 A1 | 3/2021 | Meda et al. |
| 2021/0061060 A1 | 3/2021 | Meda et al. |
| 2021/0207882 A1 | 7/2021 | Jurek |
| 2021/0239105 A1 | 8/2021 | Allard et al. |
| 2021/0276396 A1* | 9/2021 | Jurek ............... B60H 1/00364 |
| 2021/0354526 A1 | 11/2021 | Williamson et al. |
| 2022/0332170 A1* | 10/2022 | Williamson ....... B60H 1/00364 |
| 2023/0104268 A1 | 4/2023 | Do et al. |
| 2023/0111297 A1 | 4/2023 | Hwang et al. |
| 2023/0347707 A1 | 11/2023 | Meda et al. |
| 2023/0398830 A1 | 12/2023 | Eichorst et al. |

FOREIGN PATENT DOCUMENTS

| | | |
|---|---|---|
| AU | 2007237183 B2 | 9/2012 |
| AU | 2009233601 B2 | 9/2012 |
| AU | 2007202766 B2 | 8/2013 |
| AU | 354553 S | 3/2014 |
| AU | 2012261549 B2 | 5/2015 |
| AU | 367405 S | 3/2016 |
| AU | 201612249 S | 5/2016 |
| AU | 201613590 S | 7/2016 |
| AU | 201613591 S | 7/2016 |
| AU | 201613592 S | 7/2016 |
| AU | 201613593 S | 7/2016 |
| AU | 2016101949 A4 | 12/2016 |
| AU | 2017100215 A4 | 3/2017 |
| AU | 201712794 S | 5/2017 |
| AU | 201712798 S | 5/2017 |
| AU | 2017200186 A1 | 8/2017 |
| AU | 201810968 S | 3/2018 |
| AU | 201810969 S | 3/2018 |
| AU | 201810970 S | 3/2018 |
| AU | 201810971 S | 3/2018 |
| AU | 201810972 S | 3/2018 |
| AU | 201810973 S | 3/2018 |
| AU | 201810975 S | 3/2018 |
| AU | 201810977 S | 3/2018 |
| AU | 201810978 S | 3/2018 |
| AU | 201816419 S | 1/2019 |
| AU | 201910037 S | 2/2019 |
| AU | 201910038 S | 2/2019 |
| AU | 201911094 S | 4/2019 |
| AU | 201912125 S | 6/2019 |
| AU | 2017364256 A1 | 6/2019 |
| AU | 2019202512 A1 | 10/2019 |
| AU | 201915241 S | 12/2019 |
| AU | 201916406 S | 12/2019 |
| AU | 201916408 S | 12/2019 |
| AU | 201916409 S | 12/2019 |
| AU | 2018366469 A1 | 5/2020 |
| AU | 202016120 S | 1/2021 |
| AU | 202016121 S | 1/2021 |
| AU | 202016122 S | 1/2021 |
| AU | 202016123 S | 1/2021 |
| CA | 2518348 A1 | 3/2006 |
| CA | 2578651 A1 | 8/2007 |
| CA | 2587994 A1 | 12/2007 |
| CA | 2611822 A1 | 5/2008 |
| CA | 2686403 A1 | 5/2010 |
| CA | 2906348 A1 | 9/2014 |
| CA | 2951956 A1 | 12/2015 |
| CA | 2954152 A1 | 1/2016 |
| CA | 165232 S | 5/2016 |
| CA | 165233 S | 5/2016 |
| CA | 167431 S | 2/2017 |
| CA | 172872 S | 2/2017 |
| CA | 172873 S | 2/2017 |
| CA | 172874 S | 2/2017 |
| CN | 1517608 A | 8/2004 |
| CN | 1816459 A | 8/2006 |
| CN | 101943449 A | 1/2011 |
| CN | 201748561 U | 2/2011 |
| CN | 102265096 A | 11/2011 |
| CN | 202546945 U | 11/2012 |
| CN | 203083042 U | 7/2013 |
| CN | 103237671 A | 8/2013 |
| CN | 103687735 A | 3/2014 |
| CN | 204693661 U | 10/2015 |
| CN | 105159183 A | 12/2015 |
| CN | 205871826 U | 1/2017 |
| CN | 106470856 A | 3/2017 |
| CN | 304097003 S | 4/2017 |
| CN | 106976376 A | 7/2017 |
| CN | 206493894 U | 9/2017 |
| CN | 108790676 A | 11/2018 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110126588 A | 8/2019 |
| CN | 110217073 A | 9/2019 |
| CN | 110293813 A | 10/2019 |
| CN | 110385958 A | 10/2019 |
| CN | 305397384 S | 10/2019 |
| CN | 111344168 A | 6/2020 |
| CN | 213237518 U | 5/2021 |
| CN | 213237945 U | 5/2021 |
| CN | 306672354 S | 7/2021 |
| CN | 306681352 S | 7/2021 |
| CN | 306901266 S | 10/2021 |
| DE | 1472379 A1 | 12/1968 |
| DE | 19654261 A1 | 6/1998 |
| DE | 19730136 A1 | 1/1999 |
| DE | 69503723 T2 | 4/1999 |
| DE | 10012157 C1 | 6/2001 |
| DE | 20313136 U1 | 11/2003 |
| DE | 69817899 T2 | 5/2004 |
| DE | 10255833 A1 | 6/2004 |
| DE | 10336767 B3 | 12/2004 |
| DE | 59812376 | 1/2005 |
| DE | 202004007924 U1 | 10/2005 |
| DE | 202005013530 U1 | 11/2005 |
| DE | 102004032920 A1 | 3/2006 |
| DE | 202004017266 U1 | 3/2006 |
| DE | 202005000560 U1 | 5/2006 |
| DE | 102005030362 B3 | 11/2006 |
| DE | 202006001377 U1 | 5/2007 |
| DE | 202007003764 U1 | 5/2007 |
| DE | 602004004480 T2 | 5/2007 |
| DE | 202006001374 U1 | 6/2007 |
| DE | 202006001376 U1 | 6/2007 |
| DE | 202006009803 U1 | 11/2007 |
| DE | 202007006292 U1 | 9/2008 |
| DE | 102007038716 A1 | 2/2009 |
| DE | 602005012194 A1 | 2/2009 |
| DE | 202008003123 U1 | 7/2009 |
| DE | 102008028066 A1 | 12/2009 |
| DE | 602007009584 | 11/2010 |
| DE | 502007006725 | 4/2011 |
| DE | 202011101256 U1 | 11/2011 |
| DE | 202010012578 U1 | 12/2011 |
| DE | 202011002986 U1 | 6/2014 |
| DE | 202013004158 U1 | 8/2014 |
| DE | 102014200623 A1 | 7/2015 |
| DE | 102017116909 A1 | 2/2018 |

(56) References Cited

FOREIGN PATENT DOCUMENTS

| | | |
|---|---|---|
| DE | 102016220768 A1 | 4/2018 |
| DE | 112016004234 T5 | 6/2018 |
| DE | 112017000915 T5 | 10/2018 |
| DE | 102017207797 A1 | 11/2018 |
| DE | 102017214941 A1 | 2/2019 |
| DE | 112017005541 T5 | 8/2019 |
| DE | 102018204532 A1 | 9/2019 |
| DE | 102018206490 A1 | 10/2019 |
| DE | 102019205194 A1 | 10/2019 |
| DE | 102017219353 B4 | 11/2019 |
| DE | 102018206854 A1 | 11/2019 |
| DE | 202015009786 U1 | 2/2020 |
| DE | 212018000248 U1 | 2/2020 |
| DE | 212018000249 U1 | 2/2020 |
| DE | 112018003284 T5 | 3/2020 |
| DE | 112018003288 T5 | 4/2020 |
| DE | 102018222877 A1 | 6/2020 |
| DE | 112018005002 T5 | 7/2020 |
| DE | 112018005883 T5 | 7/2020 |
| DE | 102019212949 A1 | 3/2021 |
| DE | 102020203424 B3 | 7/2021 |
| DE | 112020000265 T5 | 9/2021 |
| DE | 102021208289 A1 | 2/2023 |
| EP | 115674 A2 | 8/1984 |
| EP | 0700801 A1 | 3/1996 |
| EP | 0869018 A2 | 10/1998 |
| EP | 0892225 A2 | 1/1999 |
| EP | 1527919 A1 | 5/2005 |
| EP | 1538009 A1 | 6/2005 |
| EP | 1634740 A1 | 3/2006 |
| EP | 1721765 A1 | 11/2006 |
| EP | 1752717 A1 | 2/2007 |
| EP | 1826041 A1 | 8/2007 |
| EP | 1870270 A1 | 12/2007 |
| EP | 1925889 A2 | 5/2008 |
| EP | 1955946 A2 | 8/2008 |
| EP | 1988612 A2 | 11/2008 |
| EP | 2189312 A1 | 5/2010 |
| EP | 2192040 A1 | 6/2010 |
| EP | 2196390 A1 | 6/2010 |
| EP | 2397787 A2 | 12/2011 |
| EP | 2433658 A1 | 3/2012 |
| EP | 2665611 B1 | 10/2014 |
| EP | 2921792 A1 | 9/2015 |
| EP | 2178710 B1 | 11/2015 |
| EP | 2616258 B1 | 2/2016 |
| EP | 3113965 A1 | 1/2017 |
| EP | 3193096 A1 | 7/2017 |
| EP | 3241695 A3 | 4/2018 |
| EP | 2714440 B1 | 5/2018 |
| EP | 2994326 A1 | 7/2018 |
| EP | 3401619 A1 | 11/2018 |
| EP | 3476630 A1 | 5/2019 |
| EP | 3543047 A1 | 9/2019 |
| EP | 3564564 A1 | 11/2019 |
| EP | 3677459 A1 | 7/2020 |
| EP | 3411250 B1 | 10/2020 |
| EP | 3592585 B8 | 7/2021 |
| EP | 4147892 A1 | 3/2023 |
| JP | H04160905 A | 6/1992 |
| JP | 2002013761 A | 1/2002 |
| JP | 201796577 A | 6/2017 |
| JP | 2020199805 A | 12/2020 |
| KR | 20080041058 A | 5/2008 |
| KR | 20100092070 A | 8/2010 |
| KR | 101445551 B1 | 9/2014 |
| NO | 2019097448 A1 | 5/2019 |
| RU | 2753994 C2 | 8/2021 |
| WO | 2004108448 A1 | 12/2004 |
| WO | 2007042065 A1 | 4/2007 |
| WO | 2009021994 A1 | 2/2009 |
| WO | 2009055891 A1 | 5/2009 |
| WO | 2009087094 A1 | 7/2009 |
| WO | 2012034695 A1 | 3/2012 |
| WO | 2012113538 A1 | 8/2012 |
| WO | 2012159749 A1 | 11/2012 |
| WO | 2013082692 A1 | 6/2013 |
| WO | 2014097805 A1 | 6/2014 |
| WO | 2014143181 A1 | 9/2014 |
| WO | 2014180559 A1 | 11/2014 |
| WO | 2016203542 A1 | 12/2016 |
| WO | 2017143393 A1 | 8/2017 |
| WO | 2017143394 A1 | 8/2017 |
| WO | 2017149752 A1 | 9/2017 |
| WO | 2018096127 A1 | 5/2018 |
| WO | 2018162016 A1 | 9/2018 |
| WO | 2019038023 A1 | 2/2019 |
| WO | 2019082168 A1 | 5/2019 |
| WO | 2019207451 A2 | 10/2019 |
| WO | 2019229706 A1 | 12/2019 |
| WO | 2019244011 A1 | 12/2019 |
| WO | 2020143636 A1 | 7/2020 |
| WO | 2020151541 A1 | 7/2020 |
| WO | 2020188485 A2 | 9/2020 |
| WO | 2020192746 A1 | 10/2020 |
| WO | 2021074841 A1 | 4/2021 |
| WO | 2021186414 A1 | 9/2021 |
| WO | 2023006307 A1 | 2/2023 |

OTHER PUBLICATIONS

AU Patent Application No. 2021239071 titled "Heating, Ventilation and Air Conditioning System with Illumination" filed on Jul. 6, 2022.
Office Action issued in German Patent Application No. 112021000525.1 mailed on Oct. 25, 2023.
U.S. Appl. No. 29/915,796 titled "Housing Edge for Air Conditioning Apparatus", filed Nov. 3, 2023.
U.S. Appl. No. 29/915,798 titled "Housing Portion for Air Conditioning Apparatus", filed Nov. 3, 2023.
U.S. Appl. No. 29/915,799 titled "Housing for Air Conditioning Apparatus", filed Nov. 3, 2023.
Australia Application No. 202210863 titled "Air Conditioner" filed on Feb. 16, 2022.
Australia Application No. 202210864 titled "Air Conditioner" filed on Feb. 16, 2022.
Australia Application No. 202210865 titled "Air Conditioner" filed on Feb. 16, 2022.
Australia Application No. 202210874 titled "Air Conditioner" filed on Feb. 16, 2022.
Australia Application No. 202210875 titled "Air Conditioner" filed on Feb. 16, 2022.
Australia Application No. 202210876 titled "Air Conditioner" filed on Feb. 16, 2022.
Australia Application No. 202210877 titled "Air Conditioner" filed on Feb. 16, 2022.
Australia Application No. 202210878 titled "Air Conditioner" filed on Feb. 16, 2022.
Australia Application No. 202210879 titled "Air Conditioner" filed on Feb. 16, 2022.
China Application No. 202230072949.8 titled "Rooftop heat exchanger" filed on Feb. 15, 2022.
China Application No. 202230072879.6 titled "Rooftop heat exchanger" filed on Feb. 15, 2022.
China Application No. 202230072942.6 titled "The cover of the heat exchanger" filed on Feb. 15, 2022.
China Application No. 202230073233.X titled "Rooftop heat exchanger" filed on Feb. 15, 2022.
China Application No. 202230073231 titled "Rooftop heat exchanger" filed on Feb. 15, 2022.
China Application No. 202230073218.5 titled "Rooftop heat exchanger" filed on Feb. 15, 2022.
China Application No. 202230073134.1 titled "Rooftop heat exchanger" filed on Feb. 15, 2022.
European Union Application No. 008654404-0001-0004 titled "Rooftop heat exchanger" filed on Aug. 16, 2021.
European Union Application No. 008654396-0001-0006 titled "Shape" filed on Aug. 16, 2021.

(56) References Cited

OTHER PUBLICATIONS

Office Action Issued in European Patent Application No. 19759430.2 mailed on Jan. 28, 2022.
Office Action Issued in German Application No. 102021208289 mailed on Feb. 8, 2022.
U.S. Appl. No. 29/826,757 titled "Housing", filed Feb. 15, 2022.
U.S. Appl. No. 62/819,711, filed Mar. 18, 2019 titled "Mobile Air Conditioner".
United Kingdom Application No. 6191825 titled "Ventilation and air conditioning equipment" filed on Feb. 15, 2022.
United Kingdom Application No. 6191826 titled "Ventilation and air conditioning equipment" filed on Feb. 15, 2022.
United Kingdom Application No. 6191827 titled "Ventilation and air conditioning equipment" filed on Feb. 15, 2022.
United Kingdom Application No. 6191828 titled "Ventilation and air conditioning equipment" filed on Feb. 15, 2022.
United Kingdom Application No. 6191837 titled "Ventilation and air conditioning equipment" filed on Feb. 15, 2022.
United Kingdom Application No. 6191838 titled "Ventilation and air conditioning equipment" filed on Feb. 15, 2022.
United Kingdom Application No. 6191839 titled "Ventilation and air conditioning equipment" filed on Feb. 15, 2022.
United Kingdom Application No. 6191840 titled "Ventilation and air conditioning equipment" filed on Feb. 15, 2022.
United Kingdom Application No. 6191841 titled "Ventilation and air conditioning equipment" filed on Feb. 15, 2022.
United Kingdom Application No. 6191842 titled "Ventilation and air conditioning equipment" filed on Feb. 15, 2022.
Design U.S. Appl. No. 29/645,887, filed Apr. 30, 2018 titled "Mobile Air Conditioner".
Design U.S. Appl. No. 29/660,094, filed Aug. 17, 2018 titled "Air Distribution Box".
U.S. Appl. No. 17/342,723, filed Jun. 9, 2021 titled "Vehicle Air Conditioner".
U.S. Appl. No. 63/141,800, filed Jan. 26, 2021 titled "Air Conditioning System for a Vehicle".
Design U.S. Appl. No. 29/767,929, filed Jan. 26, 2021 titled "Air Conditioner Housing".
Design U.S. Appl. No. 29/774,535, filed Mar. 17, 2021 titled "Air Distribution Box".
U.S. Appl. No. 63/175,304, filed Apr. 15, 2021 titled "Mobile Air Conditioner".
Design U.S. Appl. No. 29/715,592, filed Dec. 3, 2019 titled "Filter Housing".
Design U.S. Appl. No. 29/758,314, filed Nov. 13, 2020 titled "Air Conditioning Apparatus".
Design U.S. Appl. No. 29/760,605, filed Dec. 2, 2020 titled "Air Conditioning Apparatus".
U.S. Appl. No. 62/992,595 entitled "Heating, Ventilation and Air Conditioning System with Illumination", filed Mar. 20, 2020.
U.S. Appl. No. 62/686,217 entitled "Heating, Ventilation and Air Conditioning System with Illumination", filed Jun. 18, 2018.
U.S. Appl. No. 17/252,506 entitled "Heating, Ventilation and Air Conditioning System with Illumination", filed Dec. 15, 2020.
U.S. Appl. No. 17/205,719 entitled "Heating, Ventilation and Air Conditioning System with Illumination", filed Mar. 18, 2021.
Webasto: Rooftop air conditioning systems: Rooftop 3.5-9.9 kw Retrieved from the Internet URL; https://web.archive.org/web/20161201014045/ https://www.webasto.com/au/markets-products/off-highway/air-conditioning/rooftop-air-conditioning/rooftop-ac-35-99-kw, 2 Pages.
Webasto; Truck parking cooler: Cool Top Vario 10 E; Retrieved from the Internet URL, http://www.webasto.com/GB/marketsproducts/truck/air-conditioning/products/cool-top-vario, Apr. 25, 20216, 3 Pages.
YouTube; Viesa Kompressor; Retrieved from the Internet URL, https://www.youtube.com/watch?v=SPK17XEvVL0, May 22, 2012, 3 Pages.

10-Minute Tech, Trailer Life, Jul. 1996, pp. 69-70 dated Jul. 1, 1996.
"Dometic FreshJet 3 Series 15K" Internet URL: https://www.dometic.com/en-us/outdoor/rv-and-van/rv-air-conditioners/dometic-freshjet-3-series-15k-263393, Year:2024.
"Dometic 9600028600 FreshJet 3 Series Standard Profile Mechanical Rooftop Air Conditioner, Cool Only—15,000 BTU, White", Internet URL: https://www.amazon.com/gp/aw/d/B0BGYXRMFM/?th=1, Year: 2024.
"RecPro RV Air Conditioner 13.5K Non-Ducted | Quiet AC | 110-120V | Cooling Only | Easy Install | All-in-One Unit | for Camper, Travel Trailer, Fifth Wheel, Food Trucks, Motor Home (White)", Internet URL: https://www.amazon.com/RecPro-Conditioner-110-120V-Non-Ducted-Installation/dp/B0B22WCYKR/?th=1, Year: 2024.
Restriction Requirement issued in U.S. Appl. No. 29/826,757 mailed on Jan. 19, 2024.
Notice to Grant Issued in Chinese Application No. 202230072942.6 mailed on Dec. 19, 2023.
Office Action issued in DE Application No. 102021208289.0 mailed on Dec. 22, 2023.
Intention to Grant issued in EP Application No. 19759430.2 mailed on Jan. 5, 2024.
Notice to Grant issued in CN Application No. 202230072879.6 mailed on Jan. 3, 2024.
Office Action Issued in DE Application No. 102020206182.3 mailed on Dec. 7, 2023.
Non-Final issued in U.S. Appl. No. 17/205,719 mailed on Nov. 30, 2023.
Office Action issued in CN Application No. 202230073233.X mailed on Dec. 7, 2023.
Office Action issued in CN Application No. 202230073218.5 mailed on Dec. 7, 2023.
Office Action issued in DE Application No. 102020206183.1 mailed on Dec. 7, 2023.
Installation Manual—Brisk II (B57915, B59516, B79516), High Performance (540315, 540316), Blizzard NXT (H540315, H540316), FreshJet (FJX3473, FJX3573), Available Online at:https://www.dometic.com/en-us/outdoor/rv-and-van/rv-air-conditioners, Published Oct. 31, 2023.
Non-Final Office Action issued in U.S. Appl. No. 29/915,796 mailed on Dec. 19, 2023.
Notice of Allowance issued in U.S. Appl. No. 29/915,798 mailed on Jan. 4, 2024.
"Dometic Freshjet Rooftop Conditioner", Available from Internet, URL: https://www.amazon.com/Dometic-FreshJet-Rooftop-Conditioner-13-5K/dp/B0BGYWF8XS, 2022.
Restriction Requirement issued in U.S. Appl. No. 29/826,755 mailed on May 11, 2023.
Amazon, Evapolar Personal Air Cooler & Humidifier, Jan. 12, 2017 (retrieved from internet Sep. 27, 2017).
Negative Ion Generators, UV Purification Light; Ultraviolet Air Probe Sanitizer, Feb. 3, 2017 (retrieved from) internet Sep. 27, 2017).
Notice to Grant Issued in Chinese Application No. 202230073134.1 mailed on Apr. 12, 2022 [English translation date of issue Aug. 12, 2022; Original Chinese document date of issue Apr. 12, 2022].
Office Action Issued in German Application No. 102021208289 mailed on Jun. 2, 2022.
Office Action Issued in Chinese Application No. 201980040452.3 mailed on May 20, 2023.
Office Action Issued in Chinese Application No. 202230072879.6 mailed on Jun. 5, 2023.
Office Action Issued in Chinese Application No. 202230073218.5 mailed on Jun. 8, 2023.
Office Action Issued in Chinese Application No. 202230073233.X mailed on Jun. 28, 2023.
Notice of Allowability issued in U.S. Appl. No. 29/758,314 mailed on Jul. 17, 2023.
Office Action Issued in Chinese Application No. 202230072942.6 mailed on Jul. 28, 2023.
Corrected Notice of Allowability issued in U.S. Appl. No. 29/758,314 mailed on Aug. 18, 2023.

(56) References Cited

OTHER PUBLICATIONS

CN Patent Application No. 202280053379.5 titled "Ventilation unit and recreational vehicle with a ventilation unit" filed on Jan. 30, 2024.
Decision to Grant issued in EP Application No. 19759430.2 mailed on Mar. 14, 2024.
AU Patent Application No. 2022317094 titled "Ventilation unit and recreational vehicle with a ventilation unit" filed on Jan. 23, 2024.
EP Patent Application No. 22734620.2 titled "Ventilation unit and recreational vehicle with a ventilation unit" filed on Feb. 6, 2024.
PCT Application No. PCT/EP2024/051551 titled "Ventilation unit and recreational vehicle with a ventilation unit" filed on Jan. 23, 2024.
U.S. Appl. No. 18/293,054 titled "Ventilation unit and recreational vehicle with a ventilation unit", filed Jan. 29, 2024.
American RV Company, Dometic 459530 Duo Therm 13,500 BTU Brisk Air Conditioner High Efficiency Upper Unit Trailer Camper RV, Retrieved from the Internet URL, https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV, Mar. 23, 2014.
American RV Company, Dometic 541815 High Performance 13,500 BTU Air Conditioner Upper Unit CCC2 Required Electronics Pre-Installed Camper Trailer RV, https://web.archive.org/web/20140323014940/http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RVV Company, Dometic 541916 High Performance 15,000 BTU Air Conditioner Upper Unit Single Zone LCD Thermostat Required Electronics Pre-Installed Camper Trailer RV, https://web.archive.org/web/20140323014952/http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Apr. 15, 2012.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
Australian Patent Application 202016120 entitled "Shape X" filed Nov. 11, 2020.
Australian Patent Application 202016121 entitled "Shape X" filed Nov. 11, 2020.
Australian Patent Application 202016122 entitled "Shape X" filed Nov. 11, 2020.
Australian Patent Application 202016123 entitled "Shape X" filed Nov. 11, 2020.
Australian Patent Application 2019291452 entitled "Lighting and Mobile Air Conditioning Systems with illumination" filed Jun. 17, 2019.
Chinese Patent Application 202030660183.6 entitled "Shape X" filed Nov. 3, 2020.
Chinese Patent Application 202030659749.3 entitled "Shape X" filed Nov. 3, 2020.
Chinese Patent Application 201980040452.3 entitled "Heating, Ventilation and Air Conditioning System with Illumination" filed Jun. 17, 2019.
China Patent Application No. 202110890392.3 entitled "Ventilation and Air Conditioning Arrangement and Recreational Vehicle With a Ventilation and Air Conditioning Arrangement" filed on Aug. 4, 2021.
Dometic Product Catalog—Climate Control. 2015.
Dometic Product Catalog—Climate Control. 2016.

Dirna Bergstrom: Slim Cool; Retrieved from the Internet URL, http://www.dirna.com/files/dirna-manuals/220RE00183.pdf, May 21, 2014, 8 Pages.
Dometic Corporation, Dometic High Performance Air Conditioners, 2 pages, Jan. 1, 2011.
Dometic Duo-Therm, p. 140, Feb. 23, 2013.
Dometic Group: "Climate Control", Retrieved from the Internet URL, http://www.dometic.com/enus/Americas/USA/RV-Products/climate, 5 Pages.
Dometic Waeco Coolair RT 880; Retrieved from the Internet URL, http://www.dometic.co.uk/product/waeco-coolair-t-880-2/ May 14, 2015.
Dirna Bergstrom: Parking Coolers—No-Idle Electrical A/C—MiniCool Compact 1.4; Retrieved from the Internet URL, http://www.dirna.com/parking-coolers-no-idle-electrical-ac-compact, Mar. 17, 2015, 2 Pages.
DE Patent Application No. 102021208289 entitled "Ventilating Unit and Recreational Vehicle with a Ventilation Unit" filed on Jul. 30, 2021.
Eberspacher Cooltronic Parking Coolers with High Efficiency with the Engine OFF; Retrieved from the Internet URL, http://www.eberspacher.com/products/air-conditioning/cooltronic-truck-parking-coolers.html, Jun. 23, 2015, 10 Pages.
European Patent Office, International Search Report and Written Opinion for PCT/IB2019/055060 dated Nov. 28, 2019.
European Patent Application 007942891-0001-0004 entitled "Shape X" filed May 15, 2020.
European Patent Application 19759430.2 entitled "Heating, Ventilation and Air Conditioning System with Illumination" filed on Jun. 17, 2019.
European Union Application No. 008654396-0001-0006 titled "Lighting and Mobile Air Conditioning Systems with Illumination" filed on Aug. 16, 2021.
European Union Application No. 008654404-0001-0004 titled "Inventilate—Heat Exchanger" filed on Aug. 16, 2021.
Climate Control IBIS4-IB36H401R1, 1B36H401RIY Air conditioning roof unit Installation Manual, https://epi.dometic.com/externalassets/ibis4-roof-top-adb_9600009482_73658.pdf?ref=2016056866, published on Feb. 20, 2020.
Climate Control—FJX-Dometic FreshJet FJX Short Operating Manual EMEA16, https://manuals.plus/dometic/fix-series-fjx4233m-roof-air-conditioner-manual#axzz7gOSILhRB, Jul. 22, 2022.
Dometic FreshJet FJX4233M, FJX4233M, FJX4233EEH, FJX4333E(EH), FJX7333IHP, FJX7337IHP, FJX7457IHP—Dometic Documents Release Dates, https://documents.dometic.com/search/arabic?query=, Jun. 29, 2022.
International Search Report and Written Opinion Issued for Application No. PCT/IB2021/052330 mailed on Jun. 23, 2021.
International Preliminary Report on Patentability issued for PCT/IB2019/055060 dated Dec. 22, 2020.
Indelb; WO Oblo; Sleeping Well Oblo; Retrieved from the Internet URL, http://www.indelb.com/products/parking_air_cooler/sleeping_well/sw_oblo, Apr. 1, 2016, 2 Pages.
German Patent Application 102020206181.5 entitled "Shape X—Antenna" filed May 15, 2020.
German Patent Application 102020206182.3 entitled "Shape X—Connection Hub" filed May 15, 2020.
German Patent Application 102020206183.1 entitled "Shape X—Upgrade Kit" filed May 15, 2020.
KickStarter, Zero Breeze World's Coolest Portable Air Conditioner, Retrieved from the Internet URL, https://www.kickstarter.com/projects/1253665084/zero-breeze-the-worlds-coolest-portable-air-condit Sep. 27, 2017, 32 Pages.
Notification of Registration for European Patent Application No. 007942891-0001-0004 mailed on May 21, 2020.
Notification to Grant for Chinese Patent Application No. 202030659749.3 mailed on Apr. 12, 2021.
Notification to Grant for Chinese Patent Application No. 202030660183.6 mailed on Apr. 13, 2021.
Office Action Issued in DE Patent Application No. 102020206182.3 mailed on May 21, 2021.
Office Action Issued in DE Patent Application No. 102020206183.1 mailed on May 7, 2021.

(56) References Cited

OTHER PUBLICATIONS

Office Action Issued in DE Patent Application No. 102020206181.5 mailed on Apr. 16, 2021.

Office Action Issued in China Patent Application No. 202030660183.6 mailed on Feb. 23, 2021.

Office Action Issued in China Patent Application No. 202030659749.3 mailed on Feb. 23, 2021.

PCT Application No. PCT/EP2021/061678 entitled "Shape X—Connection Hub" filed on May 4, 2021.

Office Action Issued in Chinese Application No. 202230072879.6 mailed on Aug. 8, 2023.

Notice of Allowance issued in U.S. Appl. No. 29/826,755 mailed on Apr. 15, 2024.

Notification to Grant for Chinese Patent Application No. 202230073233.X mailed on Apr. 23, 2024.

Examination Report issued in AU Application No. 2019291452 mailed on Apr. 26, 2024.

International Search Report and Written Opinion issued in PCT Application No. PCT/EP2024/051551 mailed on May 2, 2024.

Notification to Grant for Chinese Patent Application No. 202230073218.5 mailed on May 11, 2024.

Notification to Grant for Chinese Patent Application No. 201980040452.3 mailed on May 1, 2024.

Final Office Action issued in U.S. Appl. No. 17/252,506 mailed on May 15, 2024.

European Patent Office; International Search Report and Written Opinion for PCT App. No. PCT/EP2021/061578, 9 pages, dated Aug. 20, 2021.

European Patent Office; International Search Report and Written Opinion issued in PCT App. No. PCT/EP2021/061678, 11 pages, dated Aug. 11, 2021.

European Patent Office; International Search Report and Written Opinion issued in PCT App. No. PCT/EP2021/061568, 10 pages, dated Aug. 10, 2021.

PCT Application No. PCT/EP2021/061568 entitled "Shape X—Antenna" filed on May 3, 2021.

PCT Application No. PCT/IB2021/052330 entitled "Heating, Ventilation and Air Conditioning System with Illumination" filed on Mar. 19, 2021.

PCT Application No. PCT/EP2021/061578 entitled "Shape X—Upgrade Kit" filed on May 3, 2021.

RecPro RV Air Conditioner 15K Non-Ducted I With Heat Pump for Heating or Cooling Option I RV AC Unit 1 Camper Air Conditioner (Black), https://www.amazon.com/dp/B089MH5WCM/ref=syn_sd_onsite_desktop_41?pd_rd_plhdr=t&th=1, Jun. 4, 2020.

U.S. Appl. No. 29/826,755 titled "Housing", filed Feb. 15, 2022.

PCT Application No. PCT/CN2022/109994 titled "Fresh air intake in AC" filed on Aug. 3, 2022.

PCT Application No. PCT/EP2022/067107 titled "Ventilation Unit and Recreational Vehicle With a Ventilation Unit" filed on Jun. 23, 2022.

Australia Patent Application No. 2021272652 titled "Air conditioning unit" filed on Sep. 27, 2022.

Restriction Requirement issued in U.S. Appl. No. 29/758,314 mailed on Oct. 11, 2022.

Australia Patent Application No. 2021272270 titled "Air conditioning unit" filed on Sep. 27, 2022.

International Search Report and Written Opinion issued in PCT Application No. PCT/EP2022/067107 mailed on Oct. 13, 2022.

International Search Report and Written Opinion issued in PCT Application No. PCT/CN2022/109994 mailed on Nov. 8, 2022.

U.S. Appl. No. 17/998,620 titled "Air Conditioning Unit", filed Nov. 11, 2022.

U.S. Appl. No. 17/998,623 titled "Air Conditioning Unit", filed Nov. 11, 2022.

Chinese Patent Application No. 202180034145.1 titled "Air Conditioning Unit" filed on Nov. 9, 2022.

Chinese Patent Application No. 2021800341470 titled "Air Conditioning Unit" filed on Nov. 9, 2022.

Chinese Patent Application No. 202180034825.3 titled "Air Conditioning Unit" filed on Nov. 11, 2022.

DE Patent Application No. 102023200650.2 entitled "Ventilating Unit and Recreational Vehicle with a Ventilation Unit" filed on Jan. 26, 2023.

Non-Final issued in U.S. Appl. No. 29/758,314 mailed on Feb. 27, 2023.

Office Action Issued in DE Application No. 102023200650.2 mailed on Sep. 25, 2023.

Non-Final issued in U.S. Appl. No. 17/252,506 mailed on Oct. 10, 2023.

Ex-Parte Quayle Action issued in U.S. Appl. No. 29/826,755 mailed on Oct. 10, 2023.

Final Office Action issued in U.S. Appl. No. 17/205,719 mailed on Jun. 28, 2024.

Notice of Allowance issued in Design U.S. Appl. No. 29/915,796 mailed on Jul. 15, 2024.

Notice of Allowance issued in Design U.S. Appl. No. 29/915,798 mailed on Jul. 17, 2024.

Corrected Notice of Allowance issued in Design U.S. Appl. No. 29/915,796 mailed on Aug. 5, 2024.

Non-Final Office Action issued in Design U.S. Appl. No. 29/826,757 mailed on Aug. 20, 2024.

Notice of Allowance issued in Design U.S. Appl. No. 29/826,755 mailed on Aug. 30, 2024.

Non-Final Office Action issued in U.S. Appl. No. 17/998,623 mailed on Sep. 10, 2024.

Corrected Notice of Allowance issued in Design U.S. Appl. No. 29/915,796 mailed on Sep. 19, 2024.

Corrected Notice of Allowance issued in Design U.S. Appl. No. 29/915,798 mailed on Sep. 26, 2024.

Corrected Notice of Allowance issued in Design U.S. Appl. No. 29/915,796 mailed on Oct. 23, 2024.

Notice of Allowance issued in U.S. Appl. No. 17/252,506 mailed on Oct. 23, 2024.

Decision to Grant Issued in DE Application No. 102023200650.2 mailed on Sep. 4, 2024.

\* cited by examiner

AIR CONDITIONING UNIT

This 35 U.S.C. § 371 National Stage Patent application claims priority to PCT Patent Application No. PCT/EP2021/061578, filed May 3, 2021, which claims priority to and benefit of DE Patent Application Ser. No. 102020206183.1, filed May 15, 2020, all of which is incorporated by reference herein.

The present embodiments relate to an air conditioning unit, in particular to an air conditioning unit as used on the rooftop of a recreational vehicle, and to a construction kit for such an air conditioning unit.

Air conditioning units of such type generally extract thermal energy from the air inside the vehicle and dissipate the thermal energy to the environment. For this, typically two air circuits or cycles are present inside the air conditioning unit, one air circuit for the interior air of the vehicle and the other one for the ambient air. Furthermore, the air conditioning unit is typically equipped with a certain fan arrangement for forcing the air flow inside said air circuits.

A plurality of different air conditioning units is known and available on the market. Some of the most relevant differences between these air conditioning units are cooling power, efficiency and operational noise. These characteristics have an impact on the performance, the area of application and finally on the price. When individual needs and preferences of customers change, the air conditioning unit itself has to be changed completely which involves high effort and costs and further causes waste.

The present embodiments provide an improved air conditioning unit with respect to the above drawbacks.

In order to achieve the above improvements, the present embodiments provide an air conditioning unit that is configured to be mounted externally on a vehicle and that includes a housing that is openable in a state when the air conditioning unit is mounted on the vehicle. The air conditioning unit further comprises a first air circuit within the housing, a second air circuit within the housing, an evaporator being arranged in the first air circuit and a condenser being arranged in the second air circuit.

According to the present embodiments, the air conditioning unit is configured such that at least two different fan arrangements, including a first fan arrangement and a second fan arrangement, can be installed in the air conditioning unit in a mutually exchangeable manner Each of the at least two different fan arrangements comprises a first fan and a second fan. When installed in the air conditioning unit, the first fan is arranged in the first air circuit and is configured to generate an air flow in the first air circuit in order to enhance an exchange of thermal energy between the air flowing in the first air circuit and the evaporator, and the second fan is arranged in the second air circuit and is configured to generate an air flow in the second air circuit in order to enhance an exchange of thermal energy between the air flowing in the second air circuit and the condenser.

The working principle of the air conditioning unit is based on a coolant that circulates and flows alternately through the condenser and through the evaporator. This working principle is well-known to the person skilled in the relevant field of technology and will, therefore, not be explained herein in more detail.

One key aspect of the present embodiments is that the particular fan arrangement that is initially installed in an air conditioning unit and which provides specific characteristics can be easily replaced on the customer's side by a different fan arrangement which provides specific other characteristics. The fan arrangement of an air conditioning unit has significant impact on a number of performance properties like, for example, the operational noise.

With the present embodiments it is, thus, possible to provide to the customer possibility to upgrade the air conditioning unit of his or her vehicle, or in other words to provide to the customer a kind of construction kit for upgrading his or her air conditioning unit. Such an upgrade kit includes at least a fan arrangement the customer may install inside the already present air conditioning unit. In other words, with the upgrade kit according to the present embodiments the customer can upgrade the existing air conditioning unit to achieve an air conditioning unit with different characteristics, in particular performance characteristics, without the necessity of exchanging the existing air conditioning unit against another air conditioning unit. This helps to considerably save effort and costs and reduces waste significantly compared to an entire replacement of the air conditioning unit by another one. Such an upgrade kit represents the second aspect of the present embodiments which are, however, explained in more detail further below.

The term "air circuit" is to be understood in terms that air enters the air conditioning unit through any kind of inlet at the housing, flows along a certain path or duct and exits the air conditioning unit again through any kind of outlet at the housing.

In accordance with some embodiments, the first fan arrangement includes the first fan, the second fan and a common motor for driving both the first fan and the second fan. While the first fan includes a first impeller and a first shaft, the second fan includes a second impeller and a second shaft. Such a fan arrangement may be affordable at a reasonable price, since it only has one motor for both of the fans. It has to be kept in mind that the first fan arrangement generally does not form part of the air conditioning unit of this embodiment, but the air conditioning unit is rather configured such that this particular fan arrangement can be installed.

In accordance with another embodiment, the second fan arrangement includes the first fan with a first motor for driving the first fan and the second fan with a second motor for driving the second fan, the first fan including a first impeller and a first shaft, and the second fan including a second impeller and a second shaft. Such a fan arrangement is of rather higher quality than the above-described first fan arrangement, as the type of both fans can be selected and both fans can be controlled separately. Furthermore, the second fan arrangement produces less noise than the first one, since each one of the two motors needs less output power than the common motor of the first fan arrangement. Also here, it has to be kept in mind that the second fan arrangement generally does not form part of the air conditioning unit of this embodiment, but the air conditioning unit is rather configured such that this particular fan arrangement can be installed.

In accordance with some embodiments, the air conditioning unit comprises a casing forming an air duct that serves as at least a portion of the first and/or the second air circuit inside the casing. The casing is composed of at least a first molded part and a second molded part being connected to each other. The air conditioning unit is configured such that at least each of the first molded part and the second molded part can be replaced by a corresponding molded part of differing shape in order to match with the fan arrangement that is to be installed in the air conditioning unit. With the casing, one air circuit can be separated from the other one. Since, in the air conditioning unit, different fan arrangements can be installed in a mutually exchangeable manner, the casing may be required to be of different shape either, depending on the shape of the particular fan arrangement to be installed.

The molded parts of the casing can be compared best with halves of a nutshell, each having certain cavities which, together with the cavities of all molded parts, form the air duct provided by the casing. The manufacturing of the molded parts is not particularly limited and depends on the material that is selected for the molded part. In this connection the term "molded part" does not limit the respective component with respect to the used forming method.

In accordance with some embodiments, the first and second molded parts of the casing are formed of a plastic foam material. This results in a relatively low weight. Furthermore, plastic foam materials like expanded polystyrene, expanded polypropylene and similar materials are sufficiently stabile for this purpose. Additionally, plastic foam materials have temperature isolating properties, which is advantageous since the temperatures in the first and second air circuit are typically significantly different from each other.

The plastic foam material includes expanded polypropylene. With expanded polypropylene, a high stiffness can be reached. Moreover, components made of expanded polypropylene are of high durability. Suitable forming methods for expanded polypropylene are well-known in the art.

In accordance with some embodiments, the casing forms an air duct serving as at least a portion of the first air circuit and is configured to enclose at least the first impeller. As the first air circuit is designated for the vehicle interior air to be conditioned, it is advantageous to provide the casing, especially that of expanded polypropylene, for the first air circuit, which may be for the entire first air circuit. In this regard, an advantage of having at least two molded parts for the casing becomes apparent when considering the assembling procedure of a desired fan arrangement with the corresponding casing, or respectively, with the corresponding molded parts. In particular, the first molded part can be mounted first inside the air conditioning unit. Then, the desired fan arrangement can be mounted with at least the first impeller located in a cavity provided by the first molded part. Finally, the second molded part having corresponding cavities is placed onto the first molded part, thereby enclosing entirely the first impeller. In case the motor that drives the first impeller is located outside the casing formed by the first and second molded parts, then the respective shaft (first shaft) of the first fan can reach through the casing, for example at an area where the first and second molded parts are connected with each other, as will be exemplarily shown in one of the specific embodiments described further below.

Hence, in accordance with some embodiments, the first molded part is installed on a base portion inside the air conditioning unit. The second molded part is removably placed onto the first molded part and is secured in position by the housing of the air conditioning unit. As such, no special mounting means are necessary to mount or fix the second molded part to the first molded part. In the connection area, the first and second molded parts are formed so that a horizontal movement of the second molded part with respect to the first molded part is prevented. In other words, in the connection area the first and second molded parts are form fitted to each other. The upper part of the housing, which may be removable so as to function as a lid of the air conditioning unit, finally holds down or fixes the second molded part on the first molded part. This represents a simple but effective solution.

In accordance with some embodiments, the housing has a first opening allowing air to pass through and a second opening allowing air to pass through. The first air circuit extends inside the air conditioning unit between the first opening and the second opening. During operation of the air conditioning unit, the first opening serves as an interior air inlet and the second opening serves as an interior air outlet, wherein air from the interior of the vehicle is drawn through the interior air inlet into the first air circuit and is fed through the interior air outlet back into the interior of the vehicle. In case the air conditioning unit is mounted on the roof of the vehicle, both the first opening and the second opening are provided at the underside of the housing. The dimensions of the first opening and the second opening are not particularly limited.

In accordance with some embodiments, the housing has first air vents and second air vents. The second air circuit extends inside the air conditioning unit between the first air vents and the second air vents. During operation of the air conditioning unit, the first air vents serve as an ambient air inlet and the second air vents serve as an ambient air outlet, wherein air from the environment is drawn through the ambient air inlet into the second air circuit and is discharged through the ambient air outlet back into the environment. For example, the first air vents are present at both sides of the housing and the second air vents are present at a rear side of the housing.

The shape of the first air vents and second air vents is not particularly limited. For example, the air vents comprise vertical slots arranged in parallel to one another.

In accordance with some embodiments, the air conditioning unit includes the first fan arrangement, in which the first fan is rotatable about an axis of rotation by the driving force of the common motor. Now, this embodiment represents the fully equipped and ready-to-use air conditioning unit. The first fan arrangement is installed in the air conditioning unit, but still the air conditioning unit is designed and configured such that the first fan arrangement can be dismounted again and replaced by at least the second fan arrangement.

The common motor is located outside the portion of the first air circuit formed by the casing. This has the advantage that noise generated by the air conditioning unit can be reduced inside the vehicle, in case of some embodiments above in which the first air circuit is for the interior air of the vehicle. Additionally, the casing functions as a sound or acoustic insulation.

In accordance with another embodiment, the air conditioning unit includes the second fan arrangement, in which the first fan is rotatable about an axis of rotation by the driving force of the first motor. This plastic foam materials also represents a fully equipped and ready-to-use air conditioning unit. The second fan arrangement is installed in the air conditioning unit, but still the air conditioning unit is designed and configured such that the second fan arrangement can be dismounted again and replaced by at least the first fan arrangement. As mentioned above, the second fan arrangement produces less noise than the first fan arrangement and the air conditioning unit according to this embodiment, thus, can be regarded as providing higher performance with respect to the one in which the first fan arrangement is installed.

For example, the first motor is located inside the portion of the first air circuit formed by the casing. This has the advantage of keeping the motor at a relatively constant temperature, in case of the embodiments above in which the first air circuit is for the interior air of the vehicle.

In accordance with some embodiments, the first fan is a centrifugal fan configured to displace air radially with respect to the axis of rotation. This produces less noise compared to an axial fan.

As a second aspect, a construction kit is provided that includes a fan arrangement comprising a first fan, a second fan and at least one motor for driving the first fan and/or the second fan. The first fan includes a first impeller and a first shaft. The second fan includes a second impeller and a second shaft.

According to the embodiments, the fan arrangement of the construction kit is configured for being installed in the air conditioning unit. As such, the user or customer can upgrade or adapt as required her or his air conditioning unit simply by replacing the fan arrangement. This saves effort and costs and preserves the environment in many ways.

In accordance with some embodiments, the construction kit further includes at least a first and a second molded part of a casing. The casing is configured to form an air duct serving as at least a portion of the first and/or the second air circuit of the air conditioning unit. The casing is further configured to enclose at least the first impeller or the second impeller. The first and second molded parts may correspond to any of the respective molded parts mentioned in connection with the above embodiments of the air conditioning unit. For example, the first and second molded parts of the casing are formed of a plastic foam material, additionally the first and second molded parts of the casing are formed of expanded polypropylene.

The present embodiments will be further explained in the following by use of the exemplary embodiments illustrated in the accompanying drawings, in which FIG. 1 shows an embodiment of the air conditioning unit from several different perspectives;

Figure 1:
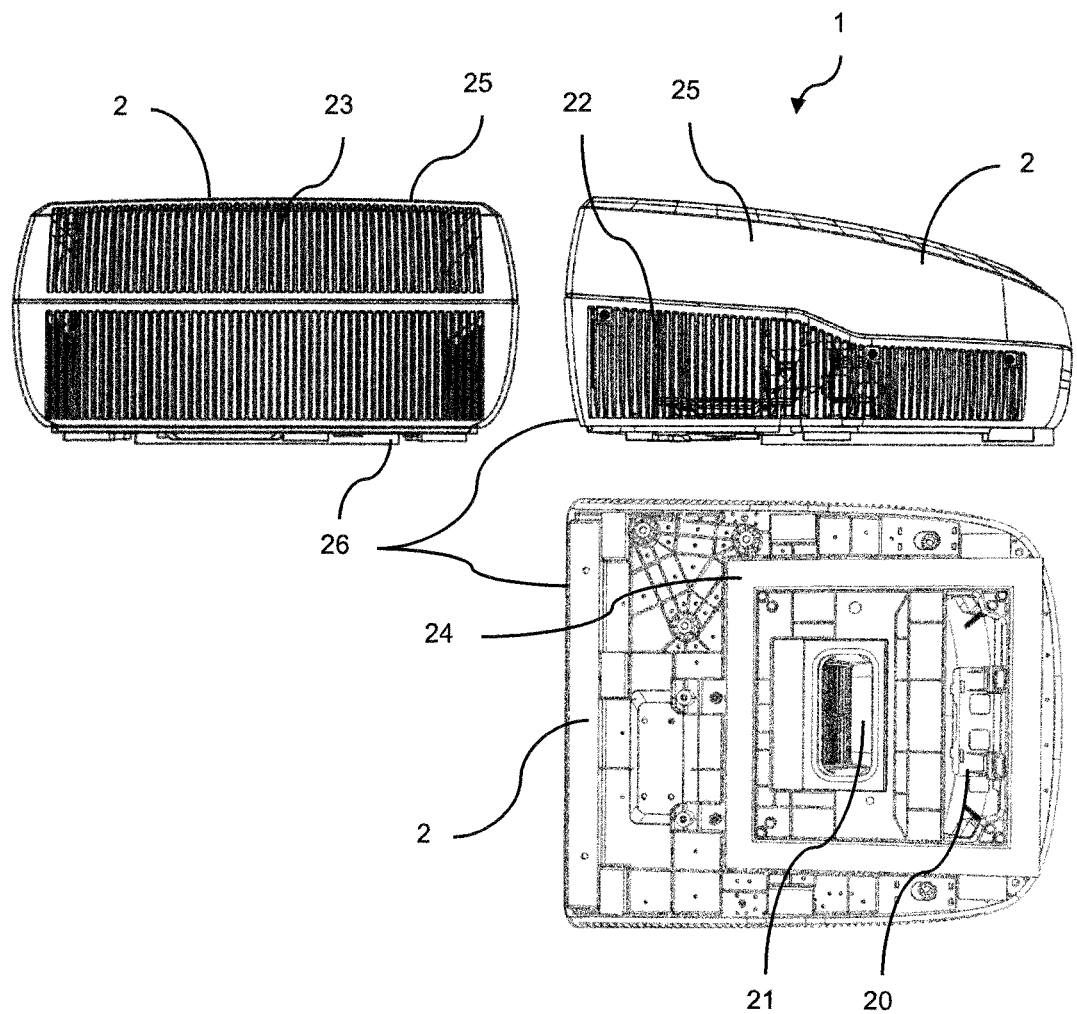

Identical components of the first and second embodiment of the air conditioning unit are assigned identical reference numbers in the drawings and in the following detailed description. The reference numbers of corresponding components of the first and second embodiment of the air conditioning unit that, however, differ from each other in the specific design are additionally marked with the letters A and B, wherein "A" refers to the first embodiment and "B" refers to the second embodiment of the air conditioning unit.

In the framework of the present embodiments, terms relating to an orientation or direction like, for example, front, rear, side, bottom, top and the like refer to the air conditioning unit or system when mounted on the rooftop of a vehicle and with respect to the travelling direction of the vehicle, unless explicitly mentioned otherwise.

Figure 19:
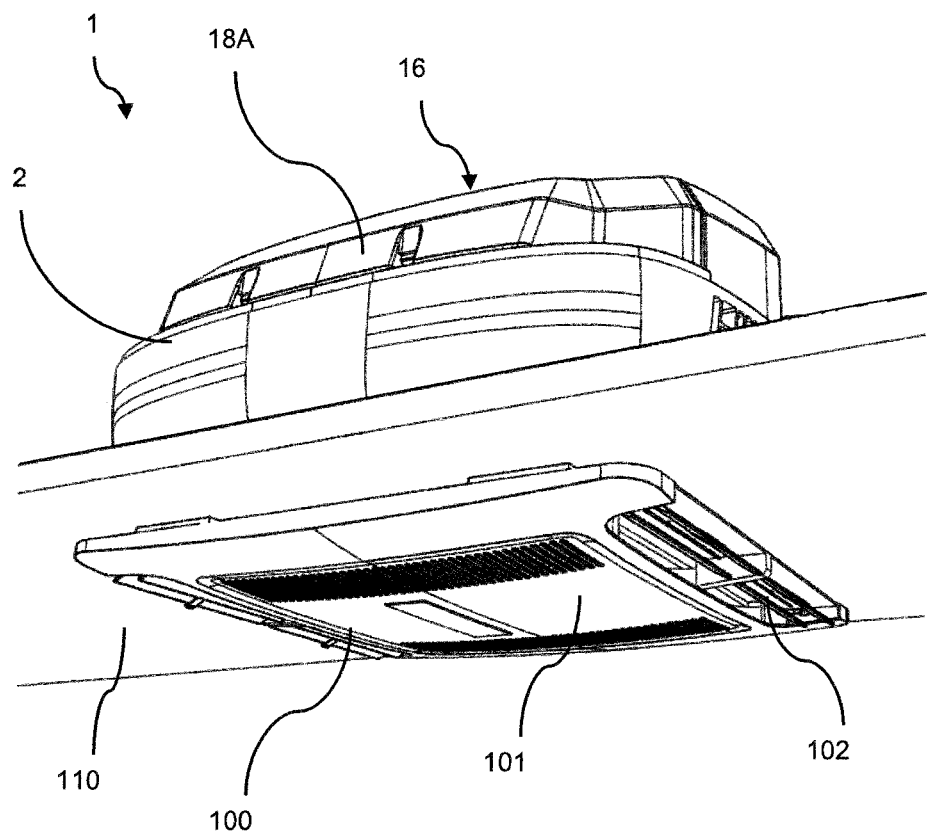
FIG. 19 shows a perspective view of an embodiment of the air conditioning system mounted on a roof of a vehicle.

FIG. 1 shows the outer appearance of the air conditioning unit 1 from behind (upper left drawing), from the side (upper right drawing) and from below (lower right drawing). Practically, the entire air conditioning unit 1 is covered by the housing 2. The housing 2 has two parts, wherein the upper part being the lid part 25 that can be removed for opening the air conditioning unit 1, also in a mounted state, for example on the roof 110 of the vehicle, as shown in FIG. 19. The lower part of the housing 2 is the base part 26 in which most of the interior components of the air conditioning unit 1 are arranged.

As it is typical for such air conditioning units, two separated air circuits are formed inside the air conditioning unit 1, an interior vehicle air circuit and an ambient air circuit. The air circuit of the vehicle interior air is designated as the first air circuit and the air circuit of the ambient air is designated as the second air circuit.

For the first air circuit, the air conditioning unit 1 has on its underside a first opening 20 and a second opening 21. The first opening 20 servs as the inlet of the vehicle interior air. The second opening 21 servs as the outlet of conditioned air that is to be fed back into the interior of the vehicle. Thereby, the connection area 24 provides for a sealed connection between the air conditioning unit 1 and the roof 110. For a proper distribution of conditioned air inside the vehicle the first opening 20 and the second opening 21 are coupled with the air distribution unit 100 which is mounted inside the vehicle, as it will be explained in further detail below with reference to FIGS. 19 and 20.

For the second air circuit, the air conditioning unit 1 has on its sides first air vents 22. The first air vents 22 serve as the inlet for ambient air. Second air vents 23 are located on the back side of the air conditioning unit 1. The second air vents 23 serve as the ambient air outlet.

Figure 2:
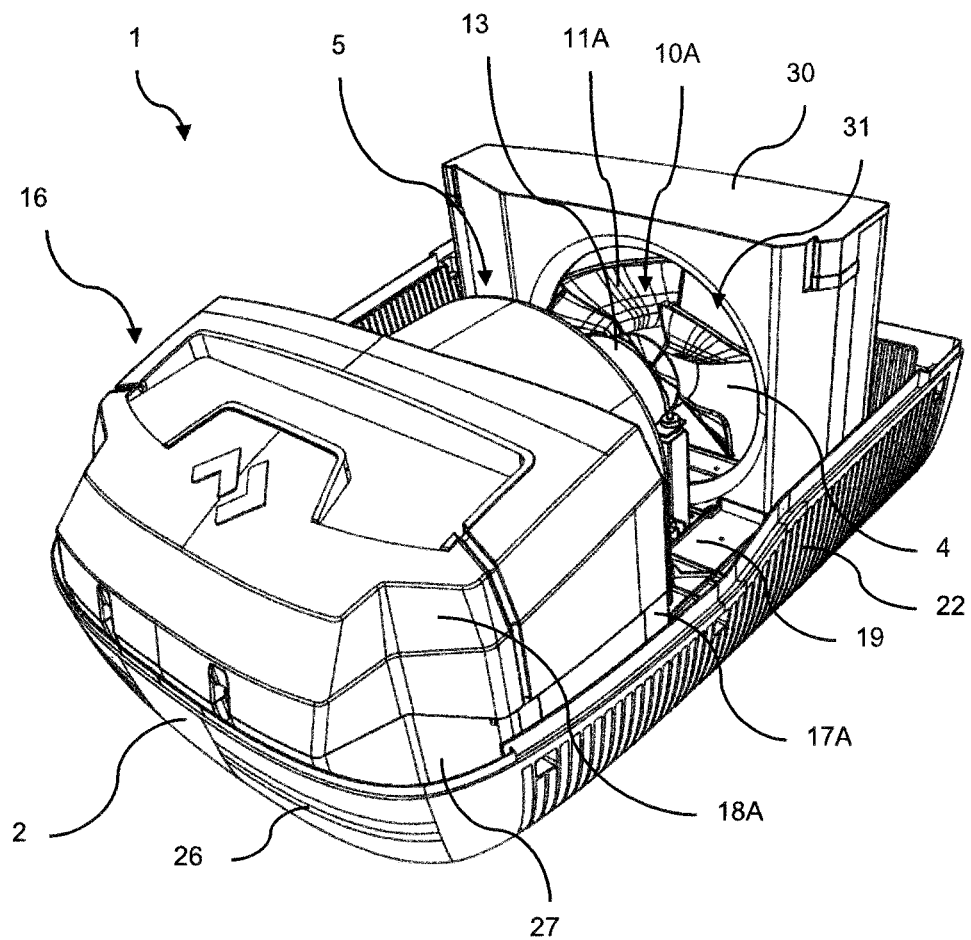
FIG. 2 shows a perspective view of a first embodiment of the air conditioning unit with open housing.

FIG. 2 shows the first embodiment of the air conditioning unit 1 with the lid part 25 of the housing 2 being removed. The first embodiment of the air conditioning unit 1 includes the specific fan arrangement 5 (first fan arrangement). The first fan arrangement 5 is essentially composed of a common motor 13 that drives two fans, one for each of the first air circuit and the second air circuit.

On the base portion 19 inside the air conditioning unit 1, a casing 16 is arranged. The casing 16 forms an air duct inside serving as a portion of the first air circuit. The casing 16 is formed of expanded polypropylene which has good temperature isolating properties and is a very light-weight material. The casing 16 is composed of three molded parts, namely the first molded part 17A, the second molded part 18A and the third molded part 27. The casing 16 is arranged at the front side of the air conditioning unit 1. The second molded part 18A and the first molded part 17A are held together and in place by the housing 2. In particular, the second molded part 18A is held in place by the lid part 25 of the housing 2.

The first molded part 17A and the second molded part 18A are connected to the third molded part 27. The third molded part 27 is installed at the base portion 19 in the region of the evaporator 3. The casing 16 thereby forms an air duct representing the entire first air circuit inside the air conditioning unit 1. Since the evaporator 3 is not intended to be replaceable as it is the case with the fan arrangements 5 and 6, the third molded part 27 remains the same in both the first and the second embodiment of the air conditioning unit 1. Each of the first molded part 17A, the second molded part 18A and the third molded part 27 is formed of expanded polypropylene.

At the rear side of the air conditioning unit 1 a condenser 4 is arranged. The condenser 4 is enclosed by the condenser housing 30. The condenser housing 30 is also made of expanded polypropylene and is open at its front and rear side allowing air to pass through. The front opening 31 is round in shape in order to match with the impeller 11A (second impeller of the first fan arrangement). The condenser is cooled by ambient air which is sucked through the first air vents 22 and guided to the condenser 4 by the second fan 10A of the first fan arrangement 5. The second fan 10A is driven by the common motor 13. Hot air is discharged through the second air vents 23 and guided back into the environment.

Figure 3:
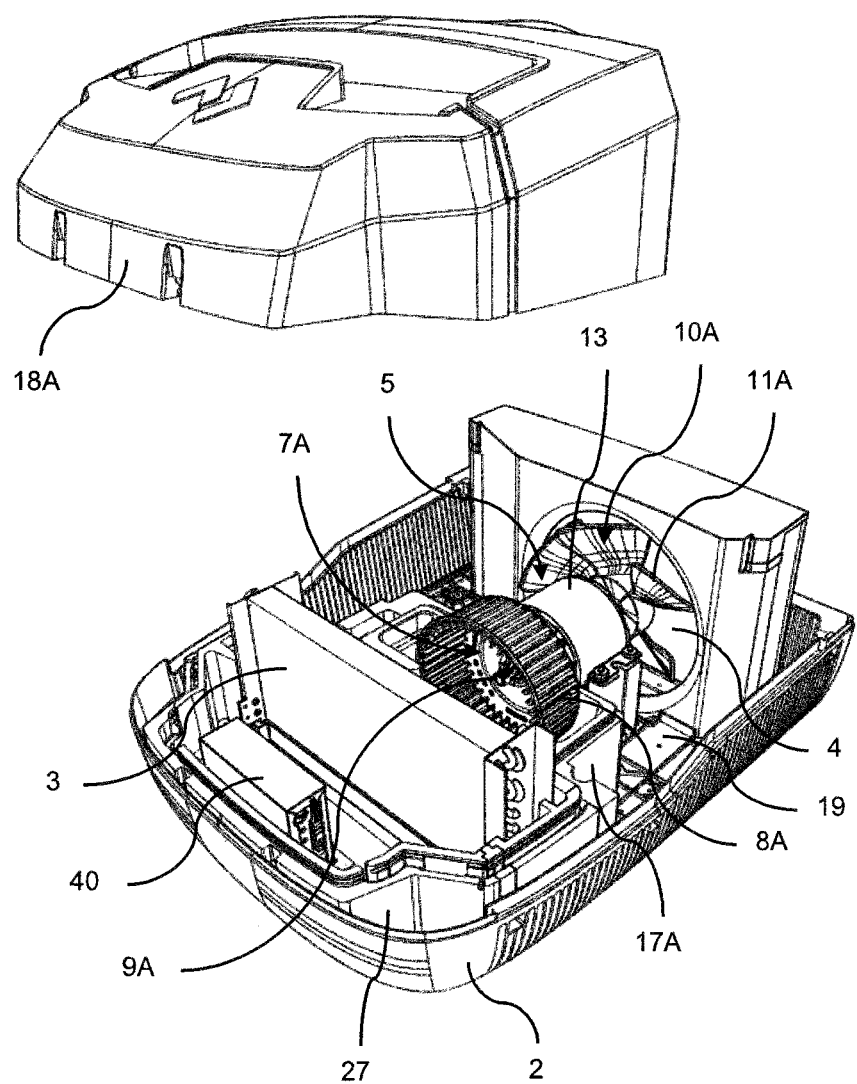
FIG. 3 shows an exploded view of the air conditioning unit shown in FIG. 2.

In FIG. 3. the second molded part 18A is lifted upwards. Thereby the interior of the casing 16 is visible. As mentioned above, the casing 16 forms the first air circuit and, thus, contains the evaporator 3 of the air conditioning unit 1 that cools down the vehicle interior air. The air flow in the first air circuit is generated by the first fan 7A of the first fan arrangement 5. The first fan 7A includes the first impeller 8A and the first shaft 9A about which the first impeller 8A rotates by the driving force of the common motor 13. The first impeller 8A of the first fan arrangement 5 is enclosed by the casing 16. In particular the first impeller 8A is enclosed by the first and second molded parts 17A and 18A of the casing 16.

The first fan 7A of the first fan arrangement 5 is a centrifugal fan that discharges air in a radial direction with respect to the axis of rotation of the fan. The second fan 10A of the first fan arrangement 5 is an axial fan. As mentioned above, both the first fan 7A and the second fan 10A of the first fan arrangement 5 are driven together by the common motor 13. The common motor 13, the first fan 7A and the second fan 10A together form the first fan arrangement 5 with which the air conditioning unit 1 is equipped.

Figure 4:
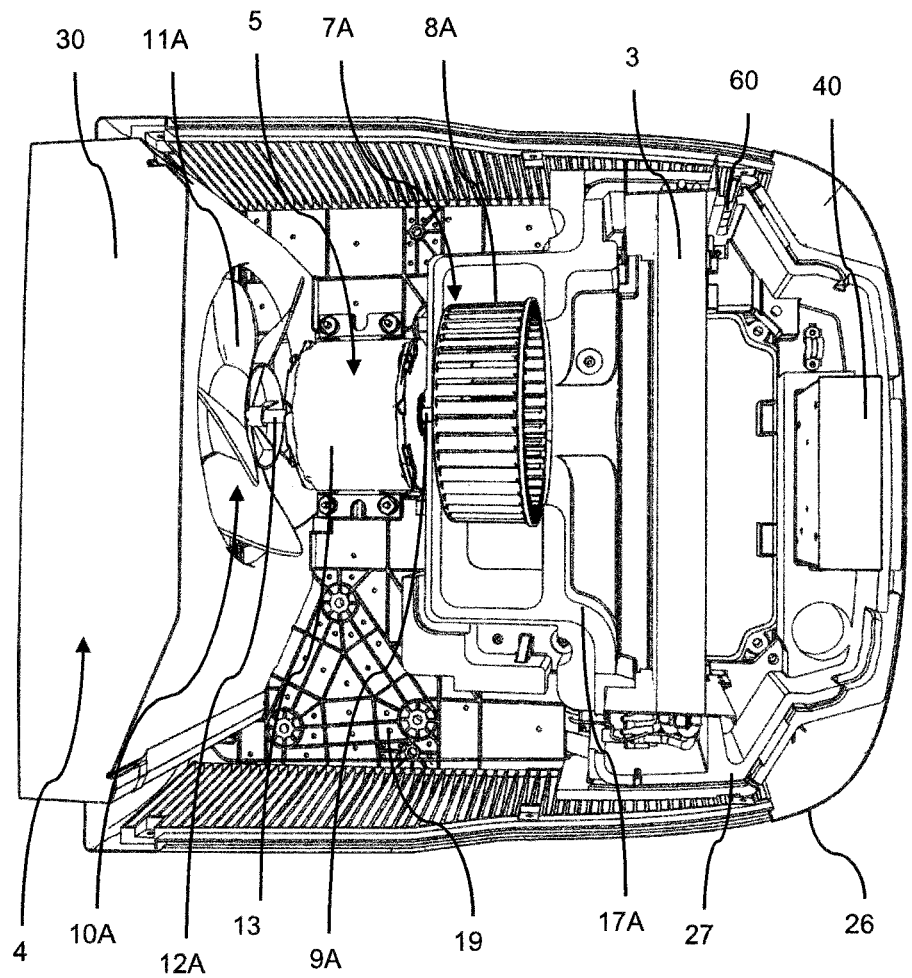
FIG. 4 shows a top view inside the air conditioning unit shown in FIGS. 2 and 3.

FIG. 4 represents a kind of a floor plan of the base part 26 of the housing 2. Here, it can be identified that the first shaft 9A and the second shaft 12A of the first fan arrangement 5 are arranged colinear with respect to each other. The common motor 13 is fixed to the base portion 19 of the base part 26. The base part 26 is equipped with several threaded bores for fixing the multiple components. For a better overview, a number of said components that are not in close context with the present embodiments are not shown in the figures, which is the reason why some fixing means on the base portion are unoccupied and visible in the figures.

Further in FIG. 4, the upper edge of the first molded part 17A of the casing 16 can be identified. The first shaft 9A reaches through the connection area between the first molded part 17A and the second molded part 18A of the casing 16. Thus, the first impeller 8A is completely enclosed within the first air circuit. Also integrated into the first air circuit is an electronic control unit 40. The electronic control unit 40 is particularly located upstream the evaporator 3 near the inlet for the interior vehicle air. This ensures a constant and moderate temperature for the control unit 40.

Figure 5:
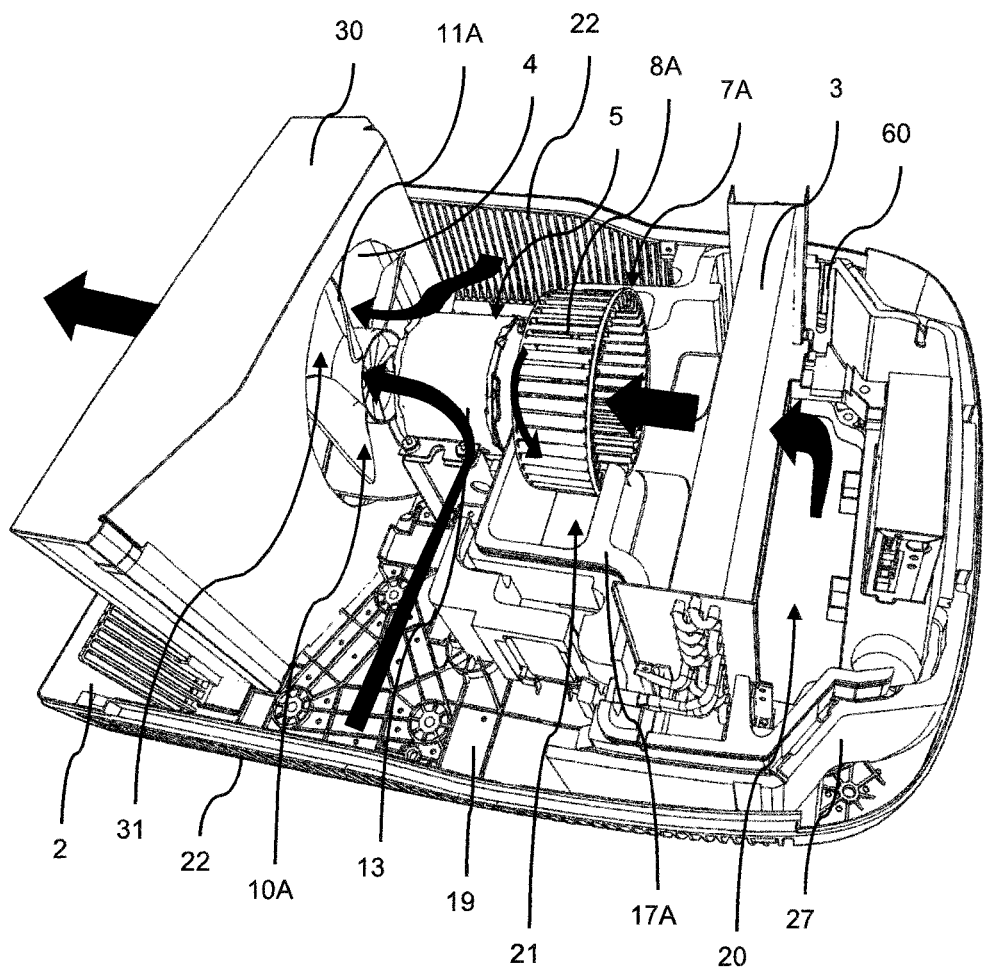
FIG. 5 shows a perspective view of the air conditioning unit shown in FIGS. 2 to 4 illustrating the working principle.

In FIG. 5 the air flow in the first and second air circuits is illustrated by arrows. With regard to the interior air of the vehicle, the air enters the first air circuit through the first opening 20 and flows around and passes by the evaporator 3. Now, the coolant in the evaporator 3 is heated up and evaporates, thereby extracting thermal energy from the air, which consequently cools down. The first fan 7A then takes in the cooled air axially and discharges the air in the radial direction through the blades of the first impeller 8A. In order to avoid a mixing of the discharge air and the intake air again, the air duct formed by the first molded part 17A and the second molded part 18A fits with the circumferential edge of the first impeller 8A at the air intake side, meaning the distal end of the first impeller 8A with respect to the common motor 13. After being radially discharged by the first fan 7A, the air is guided downwards and is fed through the second opening 21 back into the interior of the vehicle.

With regard to the ambient air, the ambient air enters the second air circuit through the first air vents 22 on both lateral sides of the air conditioning unit 1. The ambient air is guided to the second fan 10A of the first fan arrangement 5. The second impeller 11A fits into the front opening 31 of the condenser housing 30 in order to effectively and efficiently force the ambient air to flow around the condenser 4. In the condenser 4, the vaporous coolant is cooled down by the ambient air and condenses, and the air in turn is heated up. The heated air is finally discharged back into the environment via the second air vents 23 located being at the rear side of the air conditioning unit 1.

Figure 6:
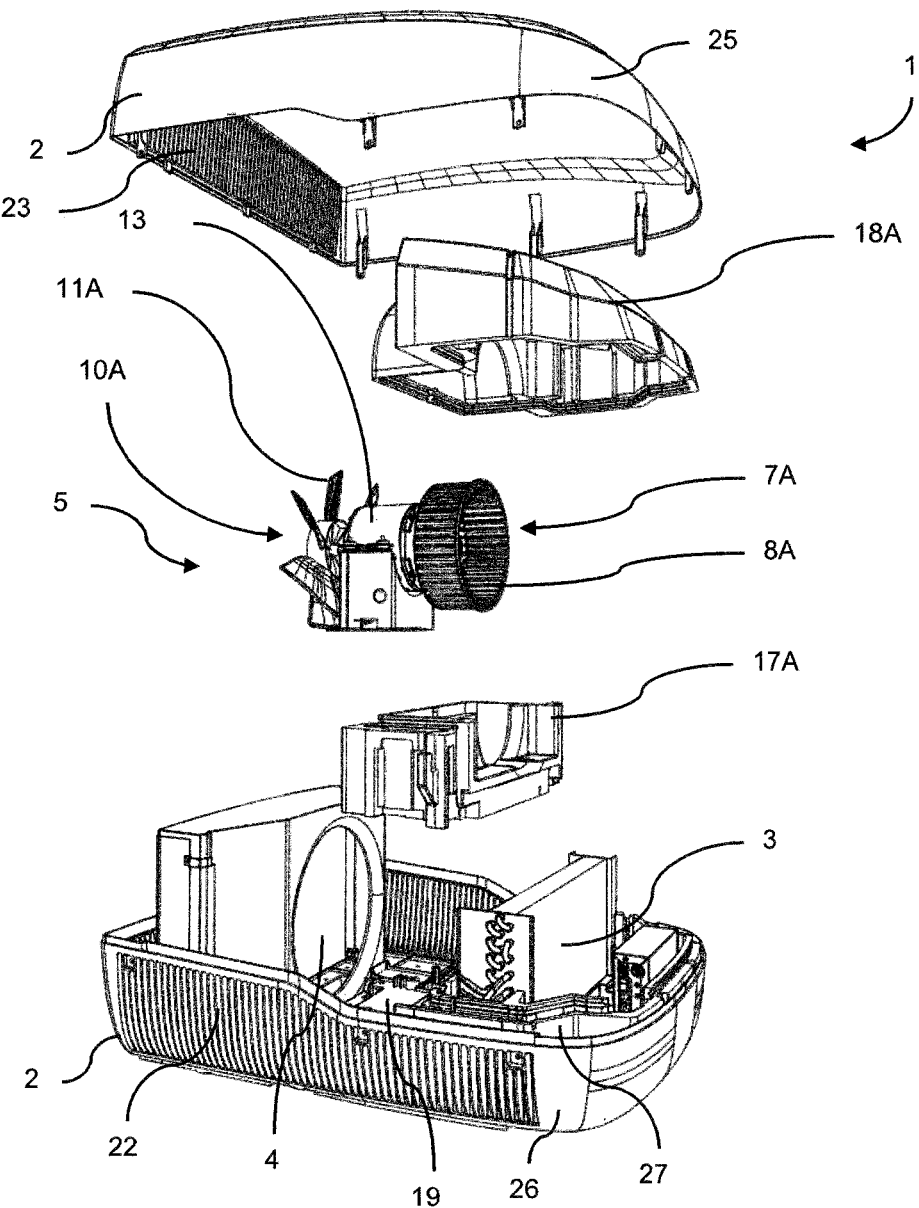
FIG. 6 shows an exploded view of the air conditioning unit shown in FIGS. 2 to 5.

In FIG. 6 the assembly of the first fan arrangement 5 with the first molded part 17A and the second molded part 18A of the casing 16 is illustrated. As such, when installing the first fan arrangement 5 into the air conditioning unit 1, the first molded part 17A is mounted to the base portion 19 of the housing 2 inside the air conditioning unit 1. Next, the first fan arrangement 5 is mounted to the base portion 19. Thereby, the first impeller 8A of the first fan 7A fits into a cavity of the first molded part 17A. Finally, the second molded part 18A is placed from above onto the first molded part 17A and the third molded part 27. The second molded part 18A, thus, is a cover that finally establishes the first air circuit as the casing 16 is formed. The second molded part 18A has a cavity enclosing the upper part of the first impeller 8A of the first fan 7A of the first fan arrangement 5.

When the mounting is completed, the lid part 25 of the housing 2 is placed onto the base part 26 of the housing 2, thereby closing the air conditioning unit 1. The lid part 25 secures the second molded part 18A from being moved upwards and, thus, keeps the casing 16 together.

Figure 7:
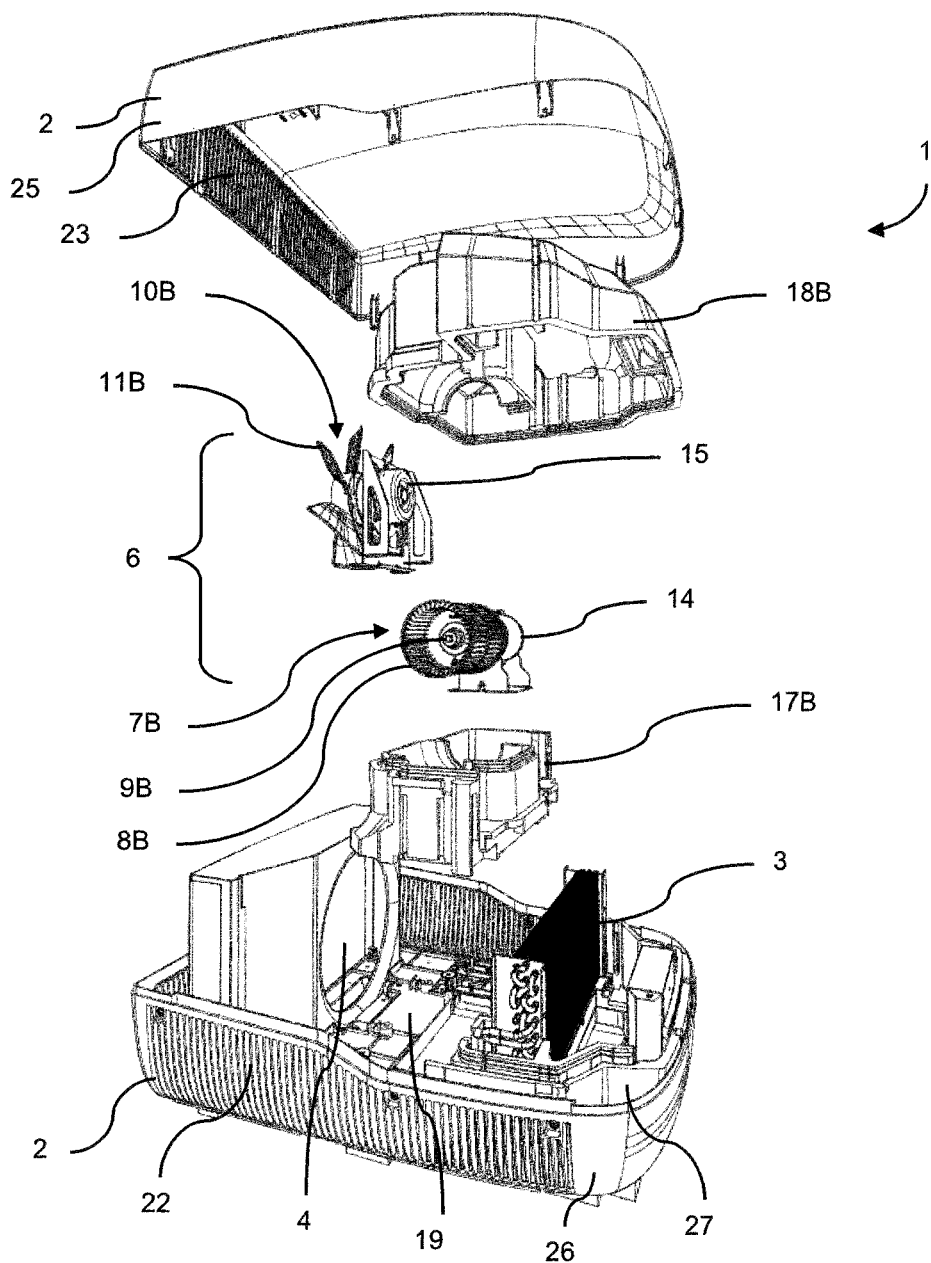
FIG. 7 shows an exploded view of the air conditioning unit according to a second embodiment.

FIG. 6 further illustrates the exchangeability of the fan arrangement that is installed in the air conditioning unit 1. The first fan arrangement 5 having a common motor 13 for both the first and the second fan 7A and 10A may not have enough power, may have not enough performance or may be too loud in the opinion of the user. The user, therefore, has the possibility, instead of referring to and achieving an entirely new air conditioning unit, to dismount the first fan arrangement 5 and to kind of upgrade the air conditioning unit 1 by installing another fan arrangement having different characteristics and performance which fulfill the user's needs. An example of such an upgrade fan arrangement having different characteristics and performance is the second fan arrangement 6, the assembly of which is illustrated in FIG. 7.

The second fan arrangement 6 includes the first fan 7B and the second fan 10B. In the second fan arrangement each of the first fan 7B and the second fan 10B is equipped with a separate motor, while the first motor 14 drives the first fan 7B and the second motor 15 drives the second fan 10B. The first and the second motors 14 and 15 are controlled separately and can, thus, be driven more effectively and efficiently according to the circumstances and user's needs.

In analogy to the first fan arrangement 5, the first fan 7B of the second fan arrangement 6 is designated to generate an air flow in the first air circuit in order to enhance an exchange of thermal energy between the air flowing in the first air circuit and the evaporator 3. Therefore, the isolating casing 16 encloses the first impeller 8B of the first fan 7B of the second fan arrangement 6.

Assembling the second fan arrangement 6 also works analogously to the first fan arrangement 5. After the removable components of the first fan arrangement 5 and its casing 16, as illustrated in FIG. 6, have been removed, the first and second molded parts 17B and 18B and the second fan arrangement 6 are installed by mounting the first molded part 17B to the base portion 19 of the base part 26 of the housing 2 inside the air conditioning unit 1. Next, the second fan 10B is mounted together with the second motor 15 of the second fan arrangement 6 to the base portion 19. The first fan 7B of the second fan arrangement 6 is mounted together with the first motor 14 as a whole in a cavity of the first molded part 17B. Finally, the second molded part 18B is placed from above onto the first molded part 17B and the third molded part 27. The second molded part 18B, thus, acts as a cover that finally establishes the first air circuit as the casing 16 is formed. The second molded part 18B has a cavity enclosing the upper part of the first impeller 8B of the first fan 7B and for the first motor 14 of the second fan arrangement 6.

When the mounting is completed, the lid part 25 of the housing 2 is placed onto the base part 26 of the housing 2, thereby closing the air conditioning unit 1. The lid part 25 thereby secures the second molded part 18B from being moved upwards and, thus, keeps the casing 16 together.

Figure 8:
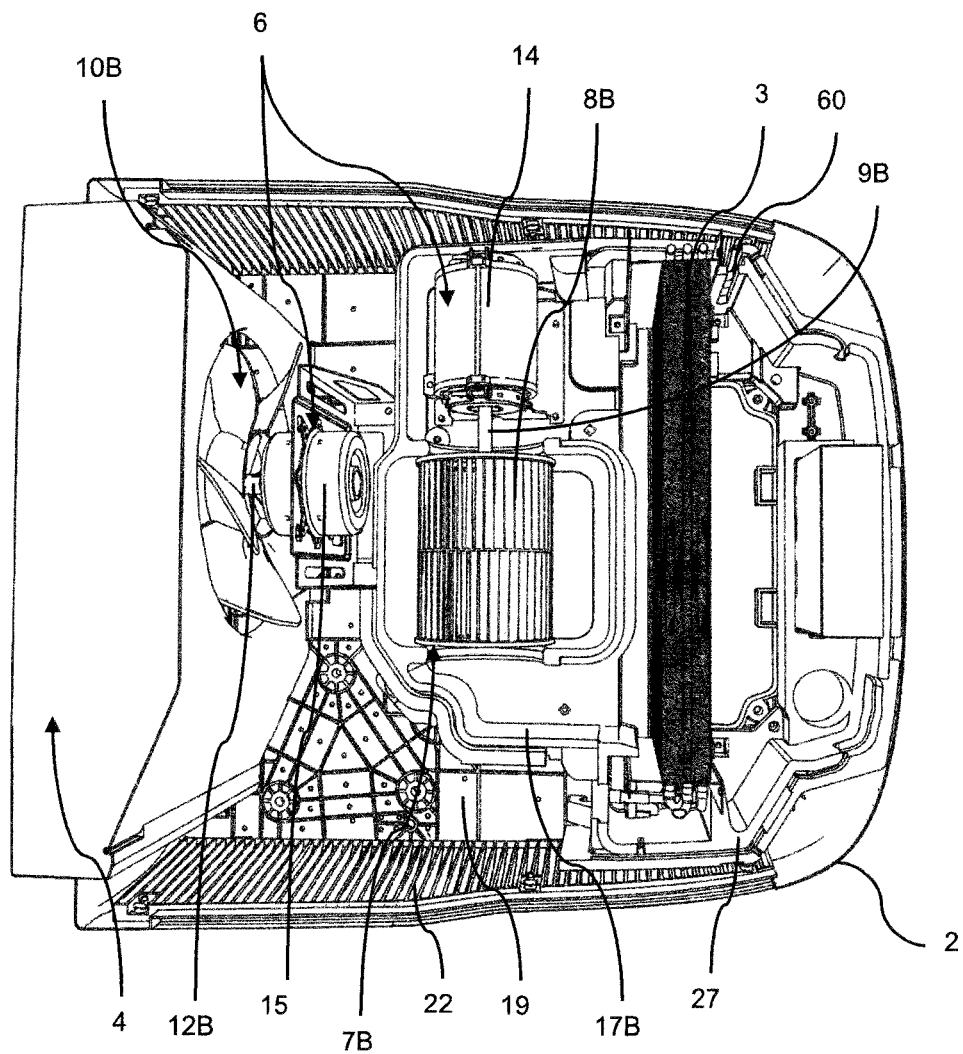
FIG. 8 shows a top view inside the air conditioning unit shown in FIG. 7.

In analogy to FIG. 4 a perspective floor plan of the base part 26 of the housing 2 according to the second embodiment of the air conditioning unit 1 is illustrated in FIG. 8. In the second embodiment of the air conditioning unit 1 the second fan arrangement 6 is installed. As mentioned above, the second fan arrangement 6 is composed of two separate components, one of which includes the first fan 7B and the first motor 14, which component is entirely enclosed by the casing 16. The motor 14 is mounted via a mounting plate on an area of the first molded part 17B inside the first air circuit. The first fan 7B or, respectively, the first impeller 8B of the first fan 7B is a centrifugal fan that sucks air in an axial direction from both sides, the distal end side and the proximal end side of the first impeller 8B with respect to the motor. At these locations, the first and second molded parts 17B and 18B are formed in that the air that is discharged from the first impeller 8B in the radial direction does not mix again with the air previously sucked in.

The second fan 10B of the second fan arrangement 6 is quite similar to the second fan 10A of the first fan arrangement 5 except that it equipped with a separate motor, namely the second motor 15. The second fan 10B and the second motor 15 form the other one of the two separate components of the second fan arrangement 6. The second motor 15 is fixed to a mounting bracket that is mounted on the base portion 19.

Figure 9:
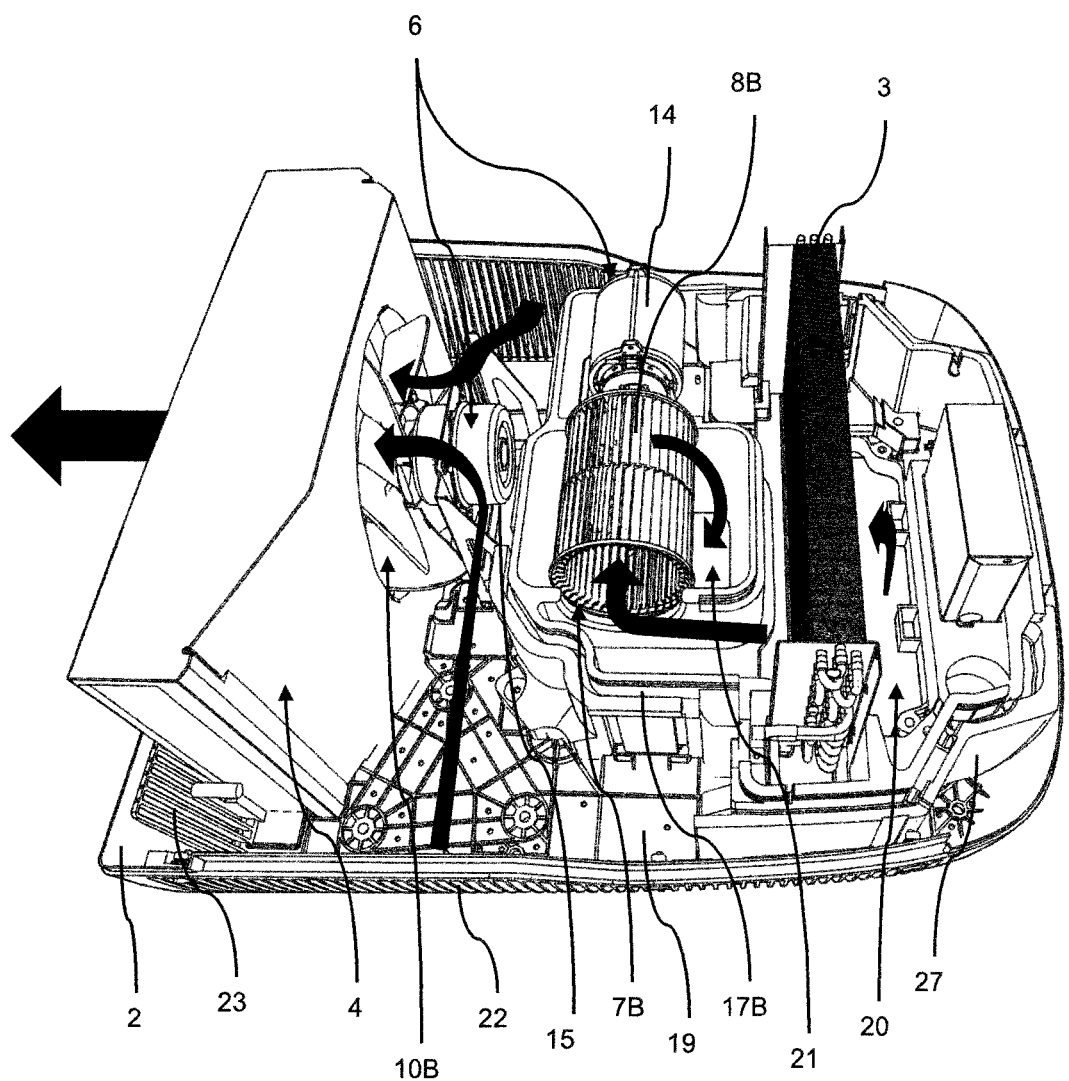
FIG. 9 shows a perspective view of the air conditioning unit shown in FIGS. 7 and 8 illustrating the working principle.

FIG. 9 illustrates by arrows the air flowing through the first and second air circuits when the air conditioning unit 1 is running With regard to the ambient air, the air flow is equivalent to that of the first embodiment. The air enters the second air circuit through the first air vents 22 on both lateral sides of the air conditioning unit 1. The air is guided to the second fan 10B of the second fan arrangement 6. The second impeller 11B fits into the front opening 31 of the condenser housing 30 in order to effectively and efficiently force the air to flow around the condenser 4. The heated air that is heated up by the condenser is finally discharged back into the environment via the second air vents 23 at the rear side of the air conditioning unit 1.

With regard to the interior air of the vehicle, the air enters the first air circuit through the first opening 20 and flows around and passes by the evaporator 3. Thereby thermal energy is extracted from the air, and consequently the air cools down. The first fan 7B then takes in the cooled air axially from both sides, as explained above. The air is discharged in the radial direction through the blades of the first impeller 8B. In order to avoid a mixing of the discharge air and the intake air again, the air duct formed by the first molded part 17B and the second molded part 18B fits with the circumferential edge of the first impeller 8B at both air intake sides of the first impeller 8B, meaning the distal end and the proximal end of the first impeller 8A with respect to the first motor 14. After being discharged in the radial direction by the first fan 7B, the air is guided downwards and is fed through the second opening 21 back into the vehicle.

Figure 10:
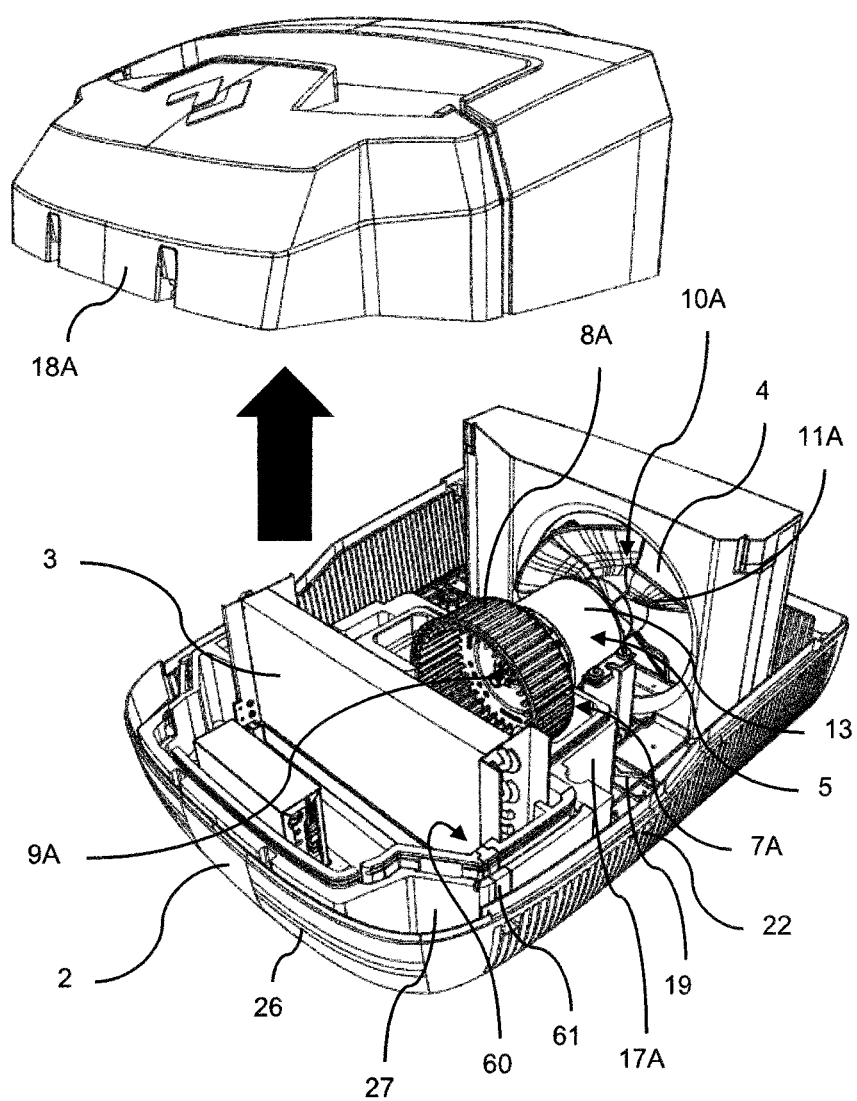
FIG. 10 illustrates a step of removing a component of the air conditioning unit according to the first embodiment.
Figure 11:
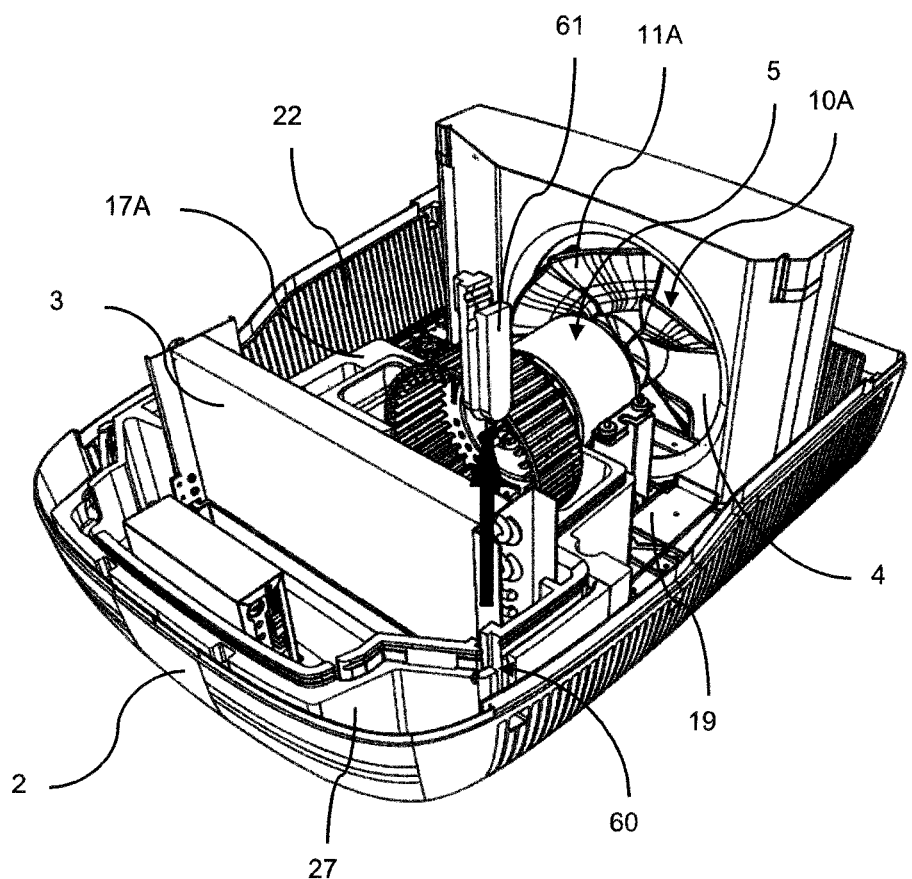
FIG. 11 illustrates a step of removing a further component of the air conditioning unit subsequently to the step shown in FIG. 10.

The air conditioning unit 1 according to the first embodiment is illustrated in FIG. 10, wherein FIGS. 10 to 16 illustrate the installation of a connection hub 50. As a first step of the installation, the second molded part 18A is removed. This exposes the first air circuit. In a wall part of the third molded part 27, a cover insert 61 is located and arranged to cover a cutout region 60. The cutout region 60 can be best seen in FIGS. 4, 5 and 8, in which the cover insert 61 is not shown. As shown in FIG. 11, the cover insert 61 is removed from the cutout region 60, here by lifting it in an upwards direction. The respective insertion and removal of the cover insert 61 into and from the cutout region 60 is assisted by guiding rails and grooves formed at the respective parts. The cover insert 61 is formed of an expanded polypropylene material as well.

Figure 12:
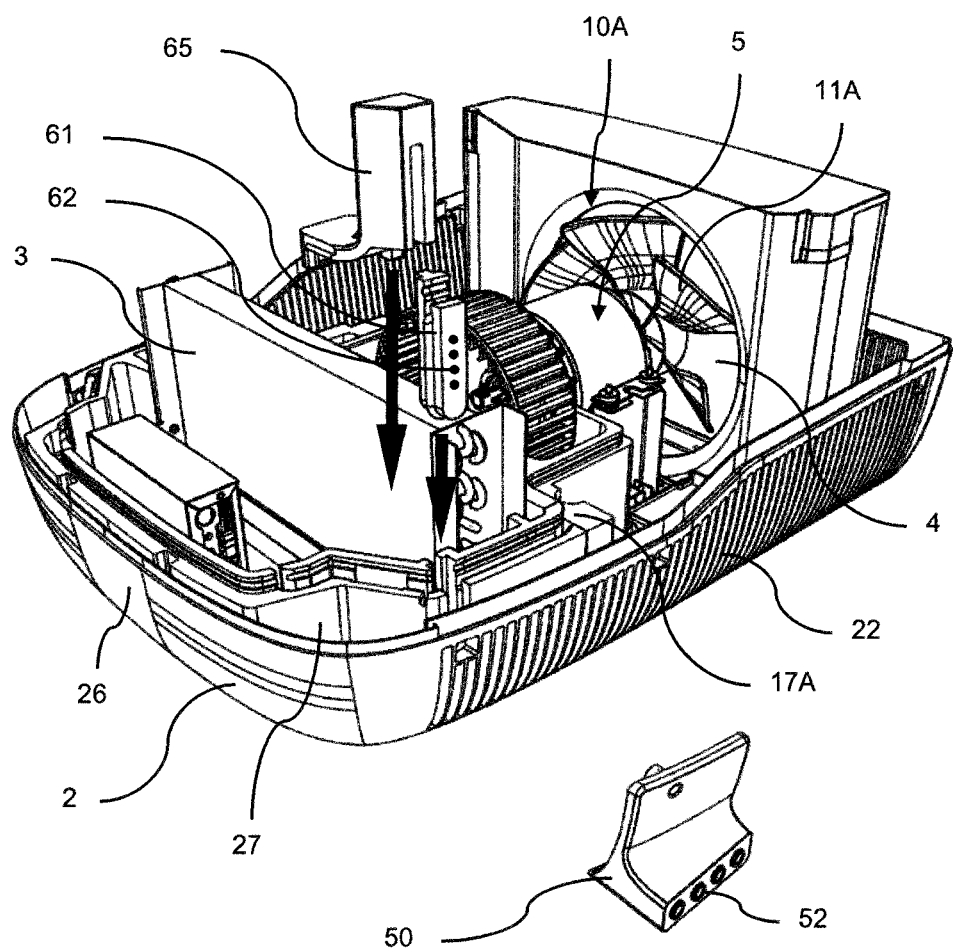
FIG. 12 illustrates a step of adding components of the air conditioning unit subsequently to the step shown in FIG. 11.

As illustrated in FIG. 12, as a next step another cover insert 61 of different shape is reinserted into the cutout region 60. This particular cover insert 61 has through holes 62. The through holes 62 are intended for routing cables through the cover insert 61 from the exterior to the interior of the air conditioning unit 1. The through holes 62 are equipped with a rubber gasket to provide for a sealing. Thus, no air leaks out the first air circuit.

Adjacent to the cover insert 61, a cable guiding part 65 is placed inside the air duct of the first air circuit formed by the third molded part 27, after the cables (not shown) are installed. The cable guiding part 65 protects the cables from damage and prevents the cables from moving around caused by the air flow and vibrations. The cables (not shown) are routed to the outside via the air vents 22 at the side of the base part 26 of housing 2.

Figure 13:
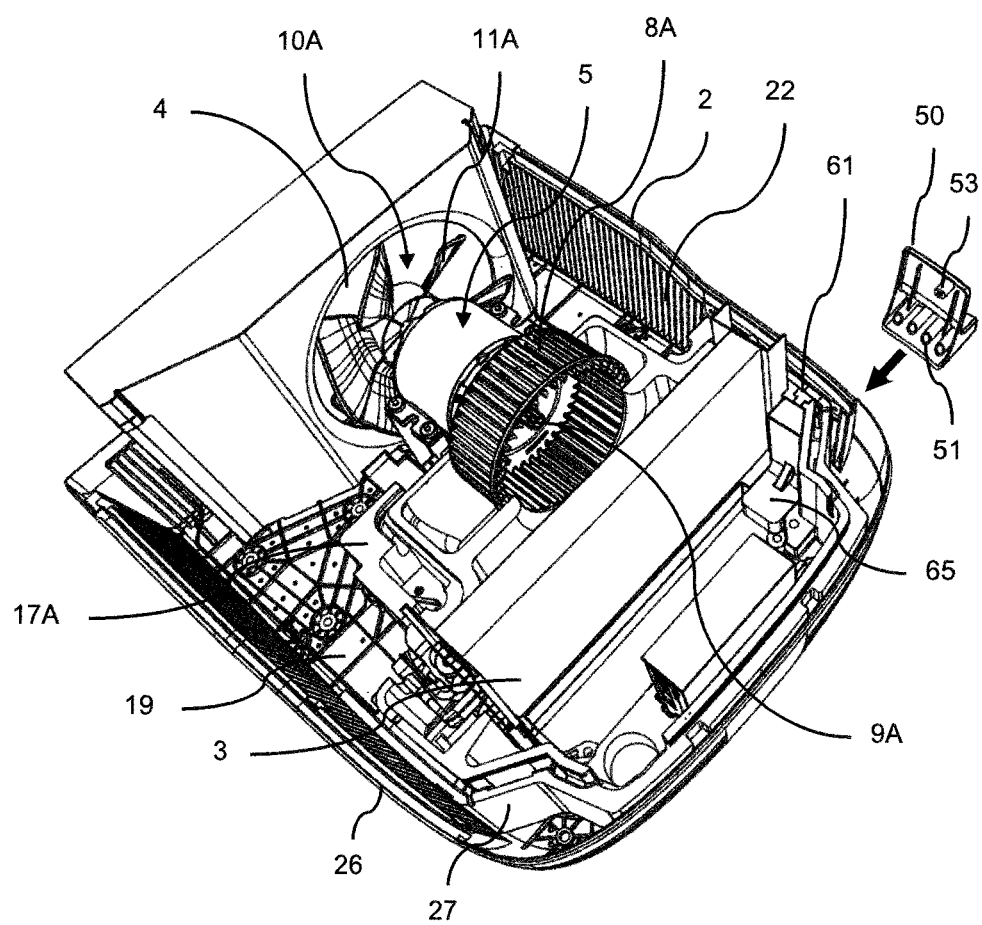
FIG. 13 illustrates a step of adding a further component of the air conditioning unit subsequently to the step shown in FIG. 12.
Figure 14:
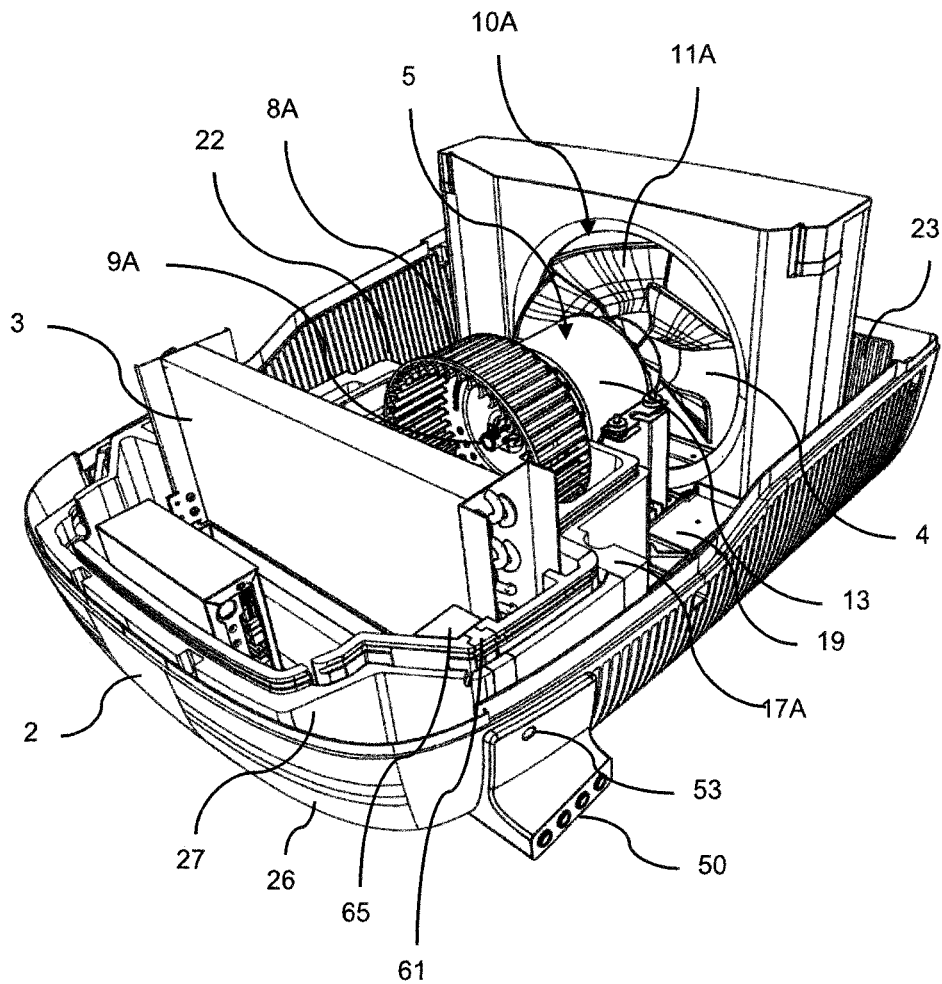
FIG. 14 shows a perspective view of the air conditioning unit as assembled in FIG. 13.
Figure 15:
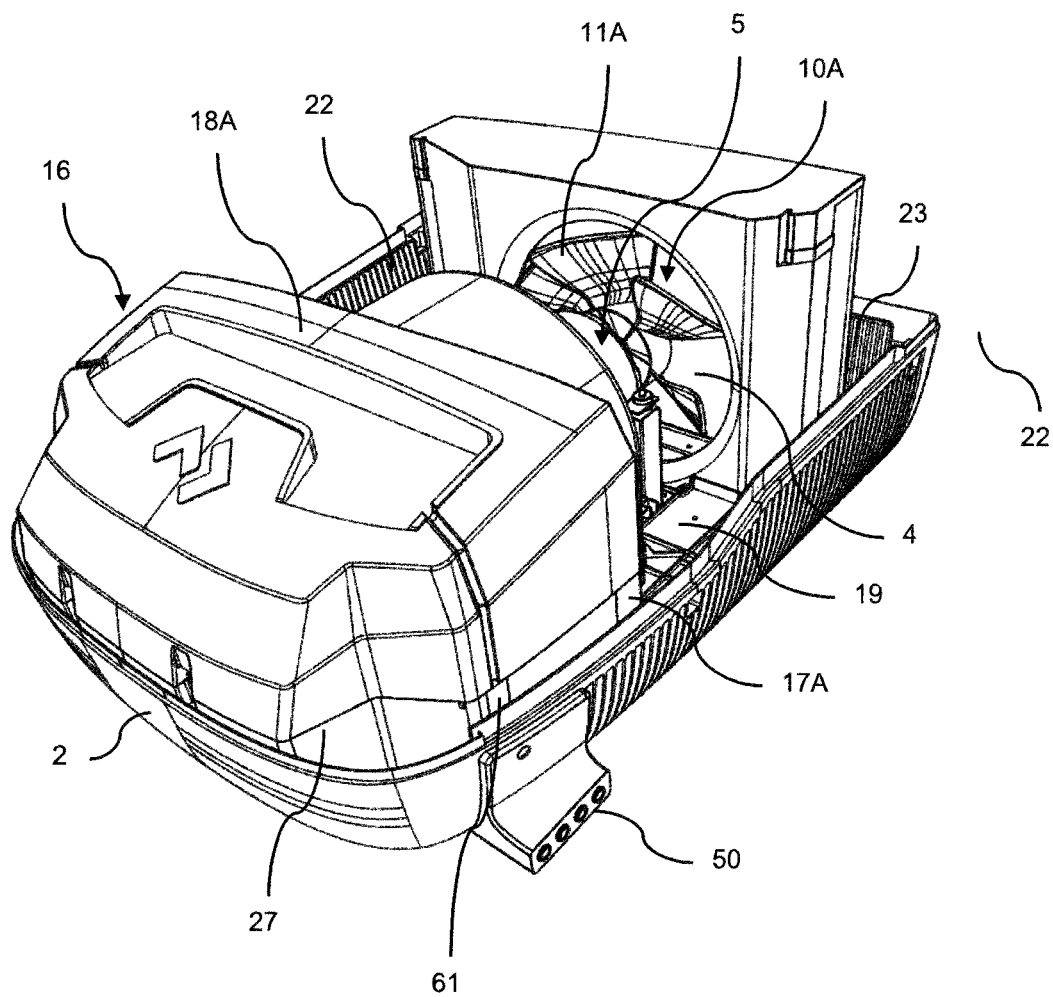
FIG. 15 shows a perspective view of the air conditioning unit of FIG. 14 with the molded cover part.
Figure 16:
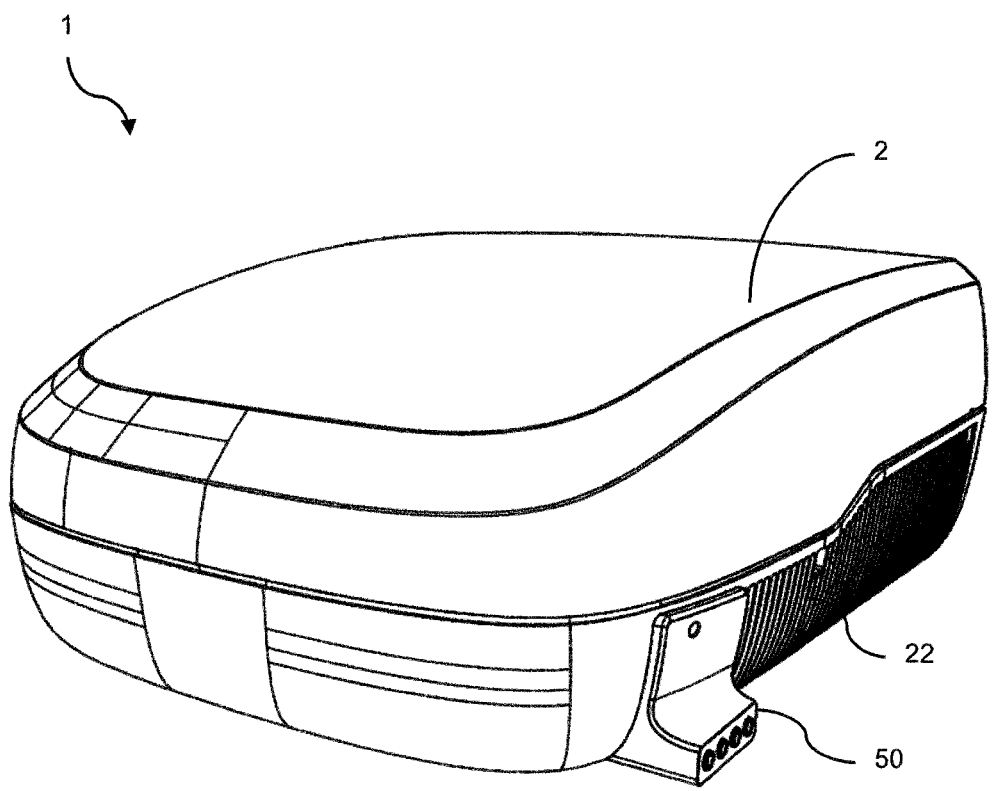
FIG. 16 shows a perspective view of the air conditioning unit of FIG. 15 with closed housing.
Figure 17:
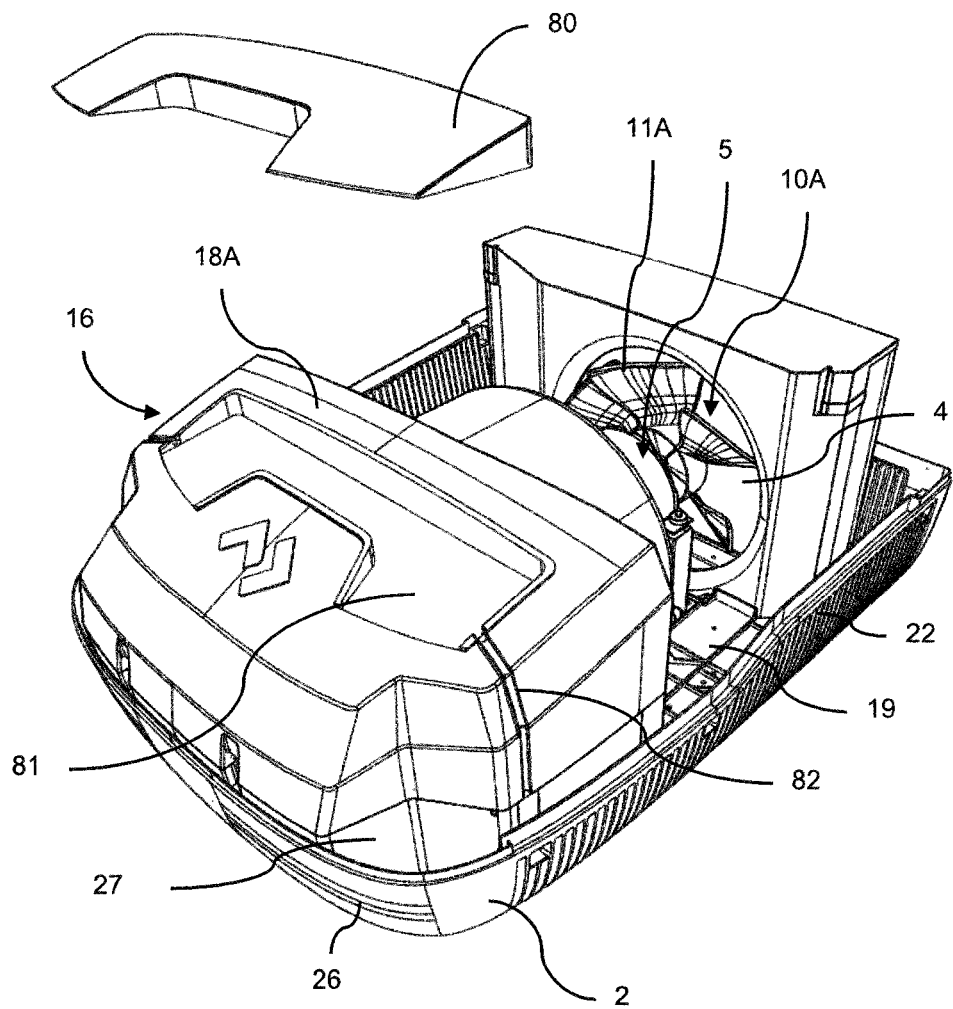
FIG. 17 shows an exploded view of the air conditioning unit shown in FIG. 2 with an antenna.

The connection hub 50 has four ports 52 configured and designed to receive the cables therethrough, as can be identified best in FIG. 13. Each port 52 is connected to a cable duct 51 that guides the cable from the port 52 to the air vents 22 in the housing 2. The cable ducts 51 have a distance to each other so that each cable duct 51 is directed towards a slot of the air vents 22. In the mounting step illustrated in FIG. 13, the connection hub is being attached and fixed to the housing via the connection means 53, which then turns out as shown in FIG. 14. The cables (not shown) are now guided, for example, from the inside of the vehicle, through the first opening 20, then guided by the cable guiding part 65 to the through holes 62 in the cover insert 61 and via the air vents 22, through the cable ducts 51, out from the ports 52 of the connection hub 50. The casing 16 is then closed again by placing the second molded part 18A on the first molded part 17A, as shown in FIG. 15. Finally, the air conditioning unit 1 is closed by the lid part 25 of the housing 2, as shown in FIG. 16.

Figure 18:
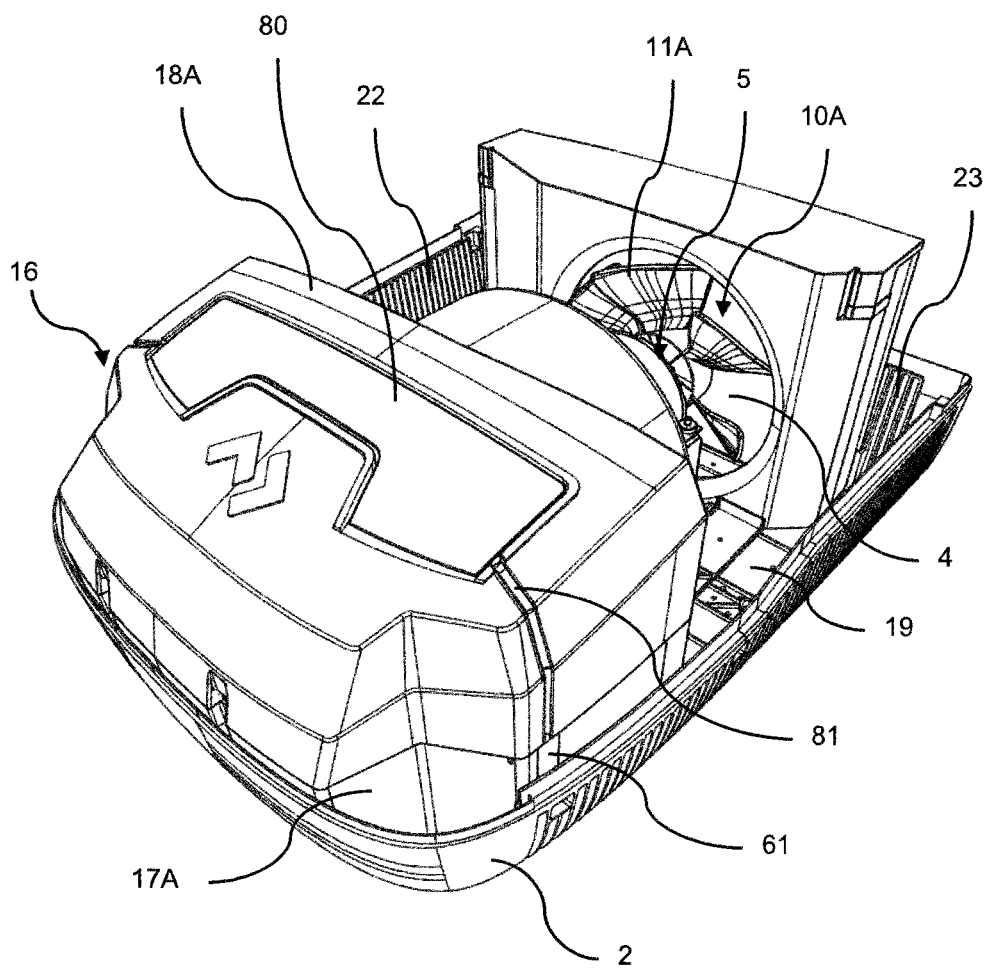
FIG. 18 shows the air conditioning unit of FIG. 17 with the antenna in place.

In FIGS. 17 to 20, while referring again to the first embodiment of the air conditioning unit 1, the mounting of an antenna 80 into the air conditioning unit 1 is illustrated. The second molded part 18A formed of expanded polypropylene has an accommodation area 81 for the antenna 80. The accommodation area 81 is formed in the second molded part 18A on an upper portion of the second molded part 18A. In the accommodation area 81 the antenna 80 is placed, as shown in FIG. 18. The exterior shape of the antenna 80 is thereby adapted to the shape of the accommodation area 81, or vice versa. Thus, the antenna 80 fits into the accommodation area 81. Furthermore, the second molded part 18A has a groove 82 for guiding a cable or a plurality of cables (not shown) of the antenna 80 from the accommodation area 81 to the connection area between the second molded part 18A and the third molded part 27. The cable is guided to the inside of the first air circuit and further through the first opening 20 (not shown here).

The cable or cables (not shown), respectively, are further guided to the inside of the vehicle to an air distribution unit 100, as shown in FIG. 19. The air distribution unit 100 is mounted to the roof 110 inside the vehicle. By the air distribution unit 100 the cooled air can be distributed inside the vehicle via the lateral outlets 102. The lateral outlets are adjustable so that the air distribution can be adapted by the user to his or her needs. Inside the air distribution unit 100, which is hidden by the cover 101, the cable or cables of the antenna 80 can be connected to a signal emitter, for example a WiFi-router (not shown). The air distribution unit 100 covered by the cover 101 has a mounting area (not shown) for mounting the signal emitter. Furthermore, the signal emitter is connected to the power source of the vehicle for the air conditioning unit 1 for receiving electrical power.

Figure 20:
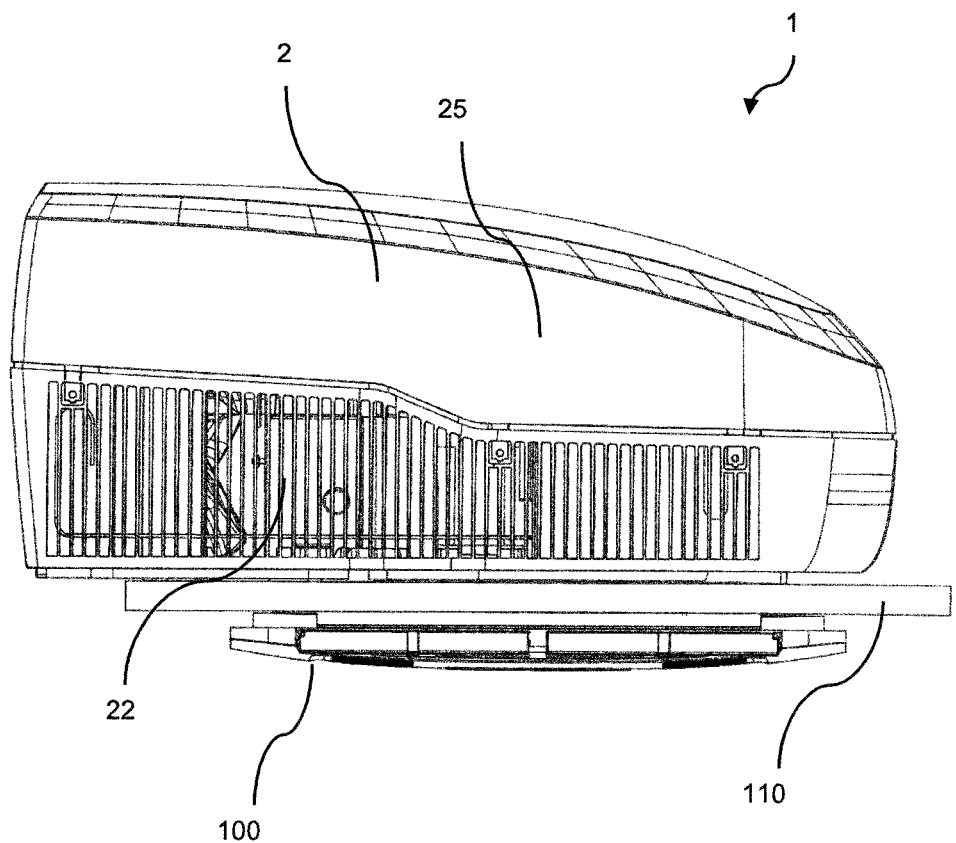
FIG. 20 a side view of the mounted air conditioning system shown in FIG. 19.

FIG. 20 finally illustrates the readily assembled air conditioning system, including the air conditioning unit 1 closed again by the lid part 25 of the housing 2 and the air distribution unit 100 from a side and mounted to the roof 110 of a vehicle.

It is to be noted that in the afore-said reference has been made to the first embodiment of the air conditioning unit 1 when describing the features if the connection hub 50 and/or the antenna 80 wherein these features work with the second embodiment of the air conditioning unit 1 as well and in the same manner as described with the first embodiment.

REFERENCE NUMERALS

1 Air conditioning unit
2 housing
3 evaporator
4 condenser
5 first fan arrangement
6 second fan arrangement
7A first fan of first fan arrangement
7B first fan of second fan arrangement
8A first impeller of first fan arrangement
8B first impeller of second fan arrangement
9A first shaft of first fan arrangement
9B first shaft of second fan arrangement
10A second fan of first fan arrangement
10B second fan of second fan arrangement
11A second impeller of first fan arrangement
11B second impeller of second fan arrangement
12A second shaft of first fan arrangement
12B second shaft of second fan arrangement
13 common motor
14 first motor
15 second motor
16 casing
17A first molded part for first fan arrangement
17B first molded part for second fan arrangement
18A second molded part for first fan arrangement
18B second molded part for second fan arrangement
19 base portion
20 first opening
21 second opening
22 first air vents
23 second air vents
24 connection area
25 lid part of housing
26 base part of housing
27 third molded part
30 condenser housing
31 front opening
40 control unit
50 connection hub
51 cable ducts
52 port
53 connection means
60 cutout region
61 cover insert
62 through holes
65 cable guiding part
80 antenna
81 accommodation area
82 groove
100 air distribution unit
101 cover
102 outlet of air distribution unit
110 roof

The invention claimed is:

1. An air conditioning unit configured to be mounted on a vehicle, comprising: a housing that is openable in a state when the air conditioning unit is mounted on the vehicle, the air conditioning unit further comprising a first air circuit within the housing, a second air circuit within the housing, an evaporator being arranged in the first air circuit and a condenser being arranged in the second air circuit, wherein the air conditioning unit is configured such that at least two different fan arrangements, including a first fan arrangement and a second fan arrangement, can be installed in the air conditioning unit in a mutually exchangeable manner, wherein each of the at least two different fan arrangements comprises a first fan and a second fan, and, when installed in the air conditioning unit, the first fan is arranged in the first air circuit and is configured to generate an air flow in the first air circuit in order to enhance an exchange of thermal energy between the air flowing in the first air circuit and the evaporator, and the second fan is arranged in the second air circuit and is configured to generate an air flow in the second air circuit in order to enhance an exchange of thermal energy between the air flowing in the second air circuit and the condenser, wherein the second fan arrangement comprises the first fan with a first motor for driving the first fan and the second fan with a second motor for driving the second fan, the first fan including a first impeller and a first shaft, and the second fan including a second impeller and a second shaft.

2. The air conditioning unit of claim 1, wherein the first fan arrangement comprises the first fan, the second fan and a common motor for driving both the first fan and the second fan, the first fan including a first impeller and a first shaft, and the second fan including a second impeller and a second shaft.

3. The air conditioning unit of claim 2, wherein the air conditioning unit includes the first fan arrangement, wherein the first fan is rotatable about an axis of rotation by a driving force of the common motor.

4. The air conditioning unit of claim 3, wherein the first fan is a centrifugal fan configured to displace air radially with respect to the axis of rotation.

5. The air conditioning unit of claim 1, wherein the air conditioning unit comprises a casing forming an air duct serving as at least a portion of the first and/or the second air circuit inside the casing, the casing being composed of at least a first molded part and a second molded part being connected to each other, wherein the air conditioning unit is configured such that at least each of the first molded part and the second molded part can be replaced by a corresponding molded part of differing shape in order to match with the fan arrangement that is to be installed in the air conditioning unit.

6. The air conditioning unit of claim 5, wherein the first and second molded parts of the casing are formed of a plastic foam material.

7. The air conditioning unit of claim 6, wherein the plastic foam material includes expanded polypropylene.

8. The air conditioning unit of claim 5, wherein the casing forms said air duct serving as at least a portion of the first air circuit and being configured to enclose at least a first impeller.

9. The air conditioning unit of claim 8, further comprising a common motor located outside the portion of the first air circuit formed by the casing.

10. The air conditioning unit of claim 5, wherein the first molded part is installed on a base portion inside the air conditioning unit and the second molded part is removably placed onto the first molded part and is secured in position by the housing of the air conditioning unit.

11. The air conditioning unit of claim 1, wherein the housing has a first opening allowing air to pass through and a second opening allowing air to pass through, the first air circuit extends inside the air conditioning unit between the first opening and the second opening, and, during operation of the air conditioning unit, the first opening serves as an interior air inlet and the second opening serves as an interior air outlet, wherein air from the interior of the vehicle is drawn through the interior air inlet into the first air circuit and is fed through the interior air outlet back into the interior of the vehicle.

12. The air conditioning unit of claim 1, wherein the housing has first air vents and second air vents, the second air circuit extends inside the air conditioning unit between the first air vents and the second air vents, and, during operation of the air conditioning unit, the first air vents serve as an ambient air inlet and the second air vents serve as an ambient air outlet, wherein air from the environment is drawn through the ambient air inlet into the second air circuit and is discharged through the ambient air outlet back into the environment.

13. The air conditioning unit of claim 1, wherein the air conditioning unit includes the second fan arrangement, wherein the first fan is rotatable about an axis of rotation by a driving force of the first motor.

14. The air conditioning unit of claim 13, wherein the first motor is located inside the portion of the first air circuit formed by a casing.

15. A construction kit including a fan arrangement for use with an air conditioning unit comprising: a first fan, a second fan and at least one motor for driving the first fan and/or the second fan, the first fan including a first impeller and a first shaft, and the second fan including a second impeller and a second shaft wherein the fan arrangement is configured to be installed in said air conditioning unit, wherein the fan arrangement comprises the first fan with a first motor for driving the first fan and the second fan with a second motor for driving the second fan, the first fan including a first impeller and a first shaft, and the second fan including a second impeller and a second shaft.

16. The construction kit of claim 15, wherein the construction kit further includes at least a first and a second molded part of a casing, the casing being configured to form an air duct serving as at least a portion of the first and/or a second air circuit of the air conditioning unit and the casing being configured to enclose at least the first impeller or the second impeller.

17. The construction kit of claim 16, wherein the first and second molded parts of the casing are formed of a plastic foam material.

18. The construction kit of claim 17, wherein the plastic foam material is polypropylene.

* * * * *